United States Patent [19]
Nanbu et al.

[11] Patent Number: 5,321,486
[45] Date of Patent: Jun. 14, 1994

[54] IMAGE FORMING APPARATUS WITH CONTROL BASED ON DETECTED AND DESIGNATED RECORDING MEDIUM SIZE

[75] Inventors: Tomoko Nanbu; Yoji Serizawa; Hidenobu Suzuki, all of Kawasaki, Japan

[73] Assignee: Canon Kabushiki Kaisha, Tokyo, Japan

[21] Appl. No.: 975,501

[22] Filed: Nov. 12, 1992

[30] Foreign Application Priority Data

Nov. 15, 1991 [JP] Japan ................................. 3-326689
Nov. 22, 1991 [JP] Japan ................................. 3-307721
Dec. 13, 1991 [JP] Japan ................................. 3-330803

[51] Int. Cl.⁵ .......................................... G03G 21/00
[52] U.S. Cl. ................................. 355/311; 355/206; 355/209; 346/160
[58] Field of Search ............... 355/311, 313, 203, 206, 355/208, 209, 75; 346/160

[56] References Cited

U.S. PATENT DOCUMENTS

| | | |
|---|---|---|
| 4,579,444 | 4/1986 | Pinckney . |
| 4,814,824 | 3/1989 | Ito et al. . |
| 5,006,891 | 4/1991 | Kasahara et al. ................ 355/208 |
| 5,008,712 | 4/1991 | Inuzuka et al. .................. 355/206 |

Primary Examiner—R. L. Moses
Attorney, Agent, or Firm—Fitzpatrick, Cella, Harper & Scinto

[57] ABSTRACT

An image forming apparatus includes a detecting unit that detects the size of a recording medium and a designating unit that designates the size of a recording medium onto which an image is to be recorded. The comparing unit compares the detected size with the designated size to determine which size is larger and a control unit controls the apparatus to perform operations such that an operation when the detected size is larger than the designated size is different from that when the detected size is smaller than the designated size.

30 Claims, 21 Drawing Sheets

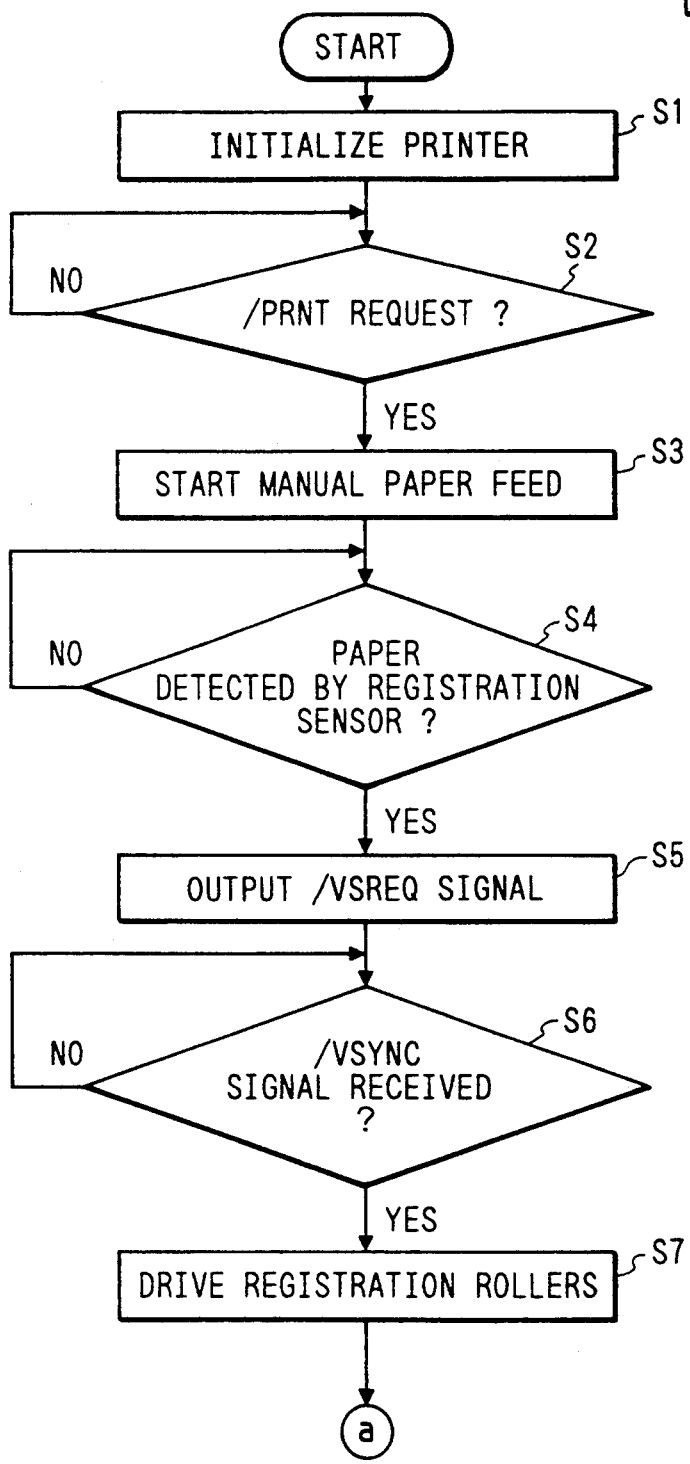

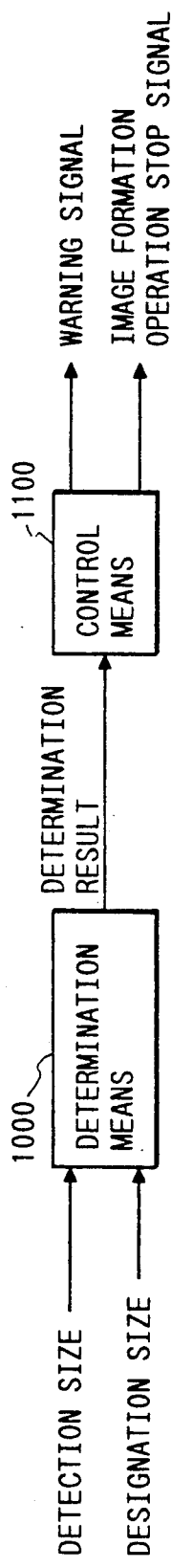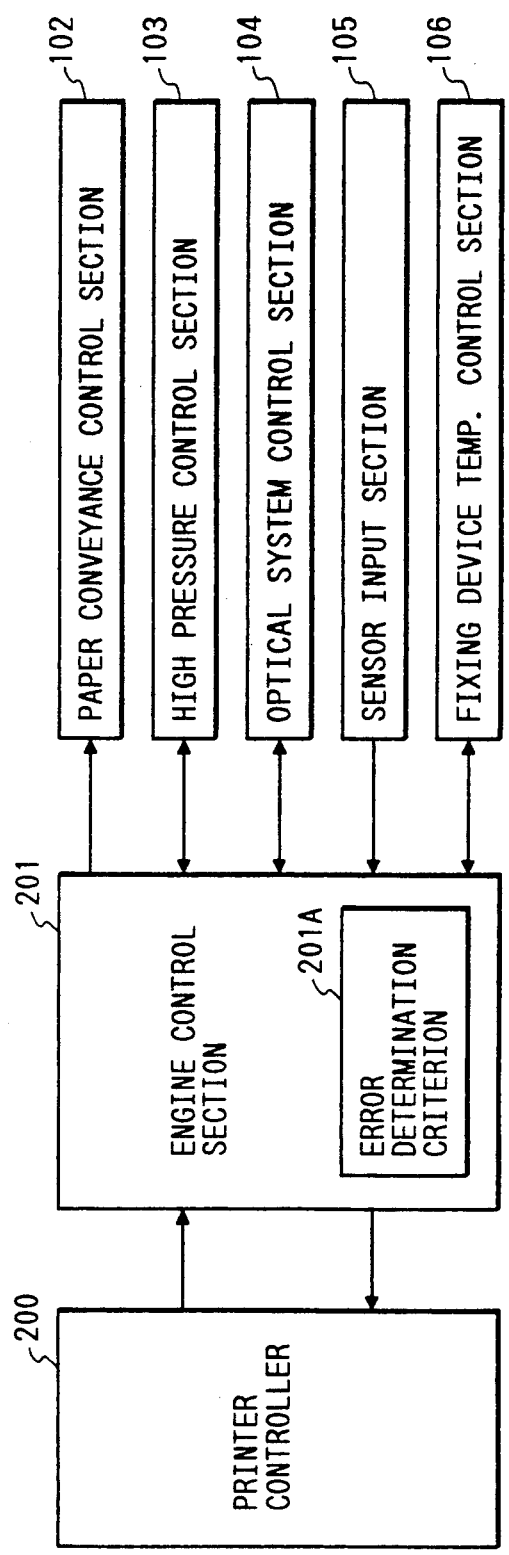

FIG. 9

PRINTER ENGINE RETURN STATUS
STATUS A

| TRANSMISSION bit | CONTENT |
|---|---|
| 1st bit | 0 |
| 2nd bit | PRINT REQUESTING |
| 3rd bit | PAPER CONVEYING |
| 4th bit | MISPRINTING |
| 5th bit | WAITING |
| 6th bit | PAUSING |
| 7th bit | CALL OCCURRING |
| 8th bit | ODD PARITY |

COMMAND A
STATUS A REQUEST
:CODE 01H

STATUS B

| TRANSMISSION bit | CONTENT |
|---|---|
| 1st bit | 0 |
| 2nd bit | JAM ERROR |
| 3rd bit | NO PAPER ERROR |
| 4th bit | DOOR OPENING |
| 5th bit | PAPER SIZE DISCORD ERROR |
| 6th bit | — |
| 7th bit | — |
| 8th bit | ODD PARITY |

COMMAND B
STATUS B REQUEST
:CODE 02H

STATUS C

| TRANSMISSION bit | CONTENT |
|---|---|
| 1st bit | 0 |
| 2nd bit | PAPER SIZE DISCORD WARNIG |
| 3rd bit | NO TONER WARNING |
| 4th bit | — |
| 5th bit | — |
| 6th bit | — |
| 7th bit | — |
| 8th bit | ODD PARITY |

COMMAND C
STATUS C REQUEST
:CODE 03H

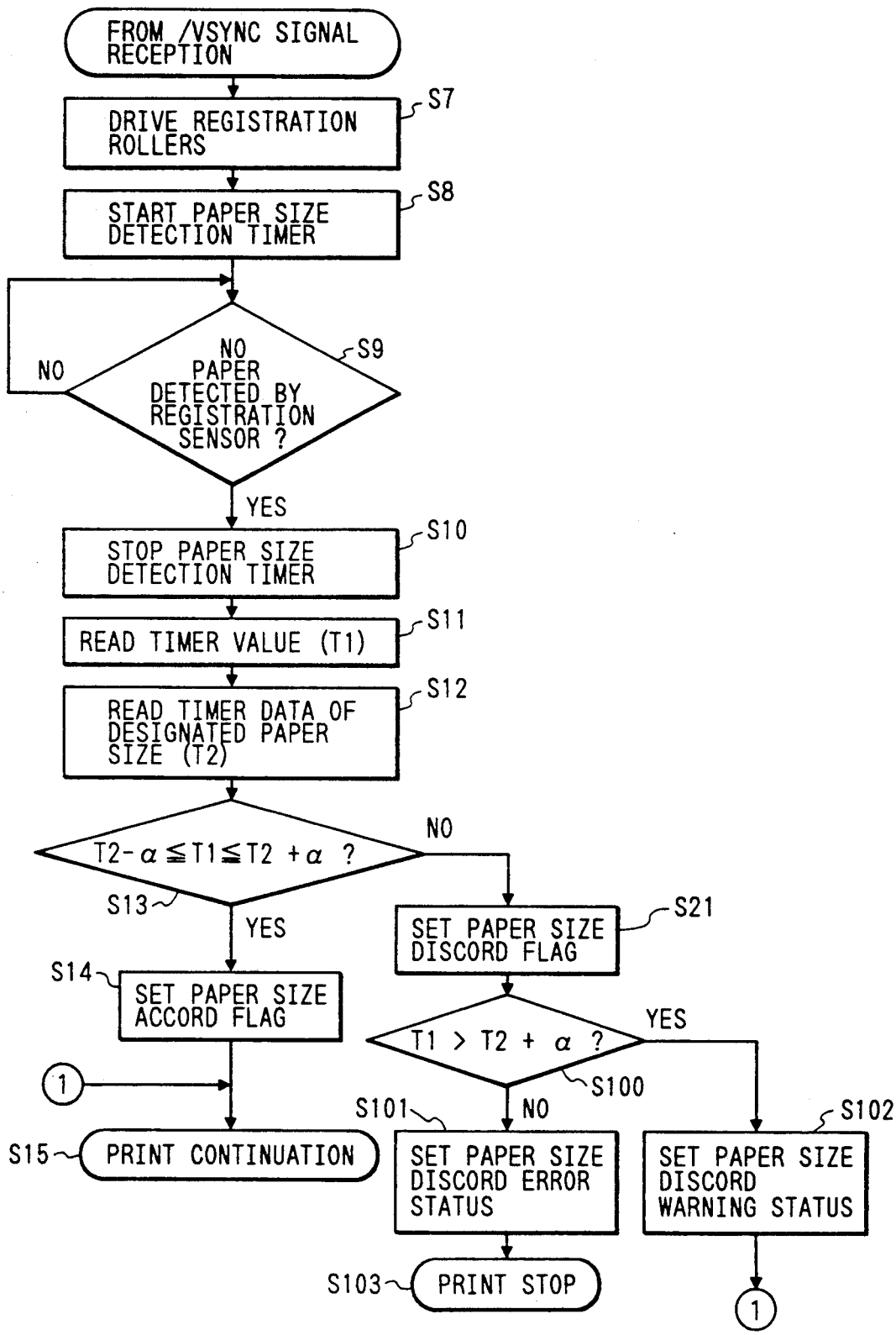

| PAPER SIZE | TIMER VALUE |
|---|---|
| B5 | $t0-\alpha \leq T1 \leq t0+\alpha$ |
| A5 | $t1-\alpha \leq T1 \leq t1+\alpha$ |
| LTR | $t2-\alpha \leq T1 \leq t2+\alpha$ |

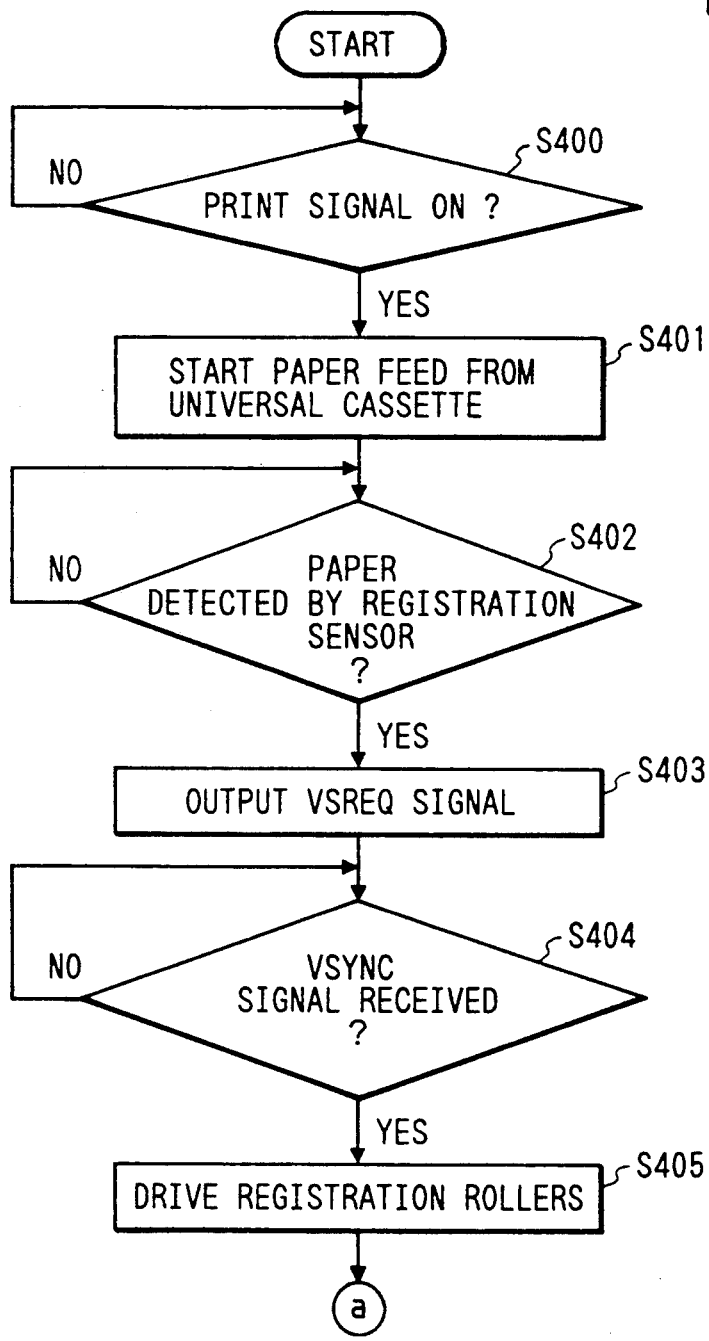

IMAGE FORMING APPARATUS WITH CONTROL BASED ON DETECTED AND DESIGNATED RECORDING MEDIUM SIZE

BACKGROUND OF THE INVENTION

1. Field of the Invention

The present invention relates to an image forming apparatus with a paper feed port unable to detect paper size in advance, such as a paper feed port to which a multiple manual paper feed tray or a universal cassette is attached.

The present invention also relates to an image forming apparatus and, more particularly, to an image forming apparatus suitable for an electrophotographic printer with a manual paper feed mechanism having no means for determining paper size.

2. Related Background Art

A conventional electrophotographic printer of this type has a mechanism as shown in FIG. 1. Referring to FIG. 1, this electrophotographic printer comprises a photoconductive drum 1 as an electrostatic latent image carrier, a semiconductor laser 2 as a light source, and a rotary polygon mirror 3. A laser beam 4 scans the surface of the photoconductive drum 1 via the rotary polygon mirror 3.

The printer also comprises a charging roller 5 for uniformly charging the photoconductive drum 1, a developing device 6 for developing an electrostatic latent image formed on the photoconductive drum 1 by using toner, a transfer roller 7 for transferring the developed toner image onto a predetermined sheet of paper, and a fixing roller 8 for fixing the toner image transferred to the paper by fusing.

A cassette paper feed roller 9 feeds paper from a cassette capable of identifying a paper size into a conveyance path, and a manual paper feed roller 10 feeds paper from a manual paper feed port incapable of identifying a paper size into the conveyance path.

Registration rollers 11 abut against the leading end of fed paper to correct a ramp of the paper and synchronize the timing at which an image is written on the photoconductive drum 1 with the timing at which paper is conveyed to it. A registration sensor 12 senses the leading end of paper and measures the length of manually fed paper in the direction of conveyance. The printer further comprises paper delivery rollers 13 for delivering paper subjected to fixing and a paper delivery sensor 14 for detecting the presence/absence of fixed paper.

FIG. 2 shows the circuit configuration of a control system for controlling the mechanism as described above.

Referring to FIG. 2, a printer controller 100 develops input image code data from external equipment, such as a host computer, into bit data required for printing of the printer and reads internal information of the printer through, e.g., transmission and displays the information.

An engine control section 101 controls the operations of individual parts of a printer engine in accordance with designations from the printer controller 100 and identifies for the printer controller 100 the printer internal information.

A paper conveyance control section 102 controls driving and stopping of, e.g., motors and rollers for paper conveyance in accordance with designations from the engine control section 101.

A high-voltage (high pressure) control section 103 controls high-voltage outputs of charging, developing, and transfer steps in accordance with designations from the engine control section 101.

An optical system control section 104 controls driving/stopping of a scanner motor and ON/OFF of a laser on the basis of designations from the engine control section 101.

A sensor input section 105 transmits information from the registration sensor and the paper delivery sensor to the engine control section 101.

A fixing device temperature control section 106 controls the temperature of a fixing device to a temperature designated by the engine control section 101.

FIG. 3, which comprises FIGS. 3A and 3B, shows a control sequence performed by the engine control section 101 to designate manual paper feed in the above control system. This flow chart illustrates a control sequence from manual feed of paper upon reception of a print request signal from the printer controller 100 to a comparison between a designated paper size and the size of the paper being actually conveyed.

First, upon switching on of a power supply, initialization of the printer engine is performed (S1). This initialization includes, e.g., initialization of a central processing unit (CPU) as the center of the engine control section 101 and processing of raising the temperature of the fixing device to that of a predetermined standby state. After initializing the printer engine, the engine control section 101 waits for a print request from the printer controller 100 (loop processing in S2).

Upon receiving the print request (/PRNT="LOW"), the engine control section 101 drives the paper conveyor system including the photoconductive drum 1 and initializes the high-voltage devices for charging, developing, and transfer. The engine control section 101 also initializes the scanner motor to a predetermined rotating speed.

When these processing operations are finished, the engine control section 101 starts paper feed from a manual paper feed port as a designated paper feed port (S3). At this time, the registration rollers 11 are kept stationary until the leading end of paper abuts against them. Thereafter, when the paper is detected by the registration sensor and a time required for the leading end of the paper to abut against the registration rollers 11 has elapsed, the engine control section 101 stops the manual paper feed and outputs a vertical sync request signal (/VSREQ) to the printer controller 100 (S4 and S5). Upon receiving a vertical sync signal (/VSYNC) from the printer controller 100, the engine control section 101 starts driving of the registration rollers 11 and activates a count-up timer for paper size measurement (S6 to S8). When no paper is detected by the registration sensor (S9), the count-up timer is stopped (S10). This timer value is defined as T1. The engine control section 101 already has as its data a reference timer value T2 corresponding to each size to be designated by the printer controller 100. When no paper is detected by the registration sensor, the engine control section 101 compares the two values T1 and T2 (S11 to S13). Note, in this comparison, that timer values of $\pm \alpha$ are added as a margin in consideration of measurement errors and errors in paper length. If the condition of $T2 - \alpha \leq T1 \leq T2 + T2 + \alpha$ is met, the engine control section 101 determines that the paper size is in accord with the designated size. If this condition is not met, the engine control section 101 determines that the paper size is different from the designated size and informs the printer controller 100 of a printer not ready state by using flag information (S13→S21). Once the printer not ready state is set, a print enable state cannot be set unless change designation for the designated paper size from the printer controller 100 is received.

FIG. 4 shows the relationship of T1, T2, and $\alpha$ in correspondence with paper.

In the above conventional printer, however, even if discord between paper sizes is detected because, for example, paper larger than the designated size is fed, that is, even if no printing data is lost, an error is detected to set the printer in the not ready state, and this disables continuation of printing.

This means that when, for example, the above sequence control is applied to an apparatus, such as a facsimile apparatus, which operates in unattended environments, the above problem disables the subsequent printing although no printing data is lost. For this reason, apparatuses using this sequence control are not easy-to-handle apparatuses for users.

FIG. 5 shows a control sequence of the engine control section 101 when manual paper feed designation is performed in accordance with another conventional technique.

First, the engine control section 101 checks whether a print request (PRNT signal) from the printer controller is received (E1). If the request is received, the engine control section 101 starts paper feed from the manual paper feed port (E2). At the same time the engine control section 101 initializes the high-voltage system, the optical system, and the driving system and waits until the leading end of the paper reaches the registration sensor (E3). If the paper has reached the registration sensor, the engine control section 101 outputs a VSREQ signal, as a vertical sync request signal, to the printer controller (E4). Thereafter, upon receiving a VSYNC signal from the printer controller (E5), the engine control section 101 drives the registration rollers that have been kept stopped (E6). At the same time, the engine control section 101 checks whether a paper size is currently designated by the printer controller (E7). If the size is designated, the engine control section 101 sets a timer corresponding to the designated size (E8). If no size is designated, the engine control section 101 sets a timer corresponding to the maximum paper size usable by the printer (E9). At the end of the timer count, the engine control section 101 checks whether a print request for the next page is present (E11). If the print request is present, the engine control section 101 starts the manual paper feed (E2); if not, the engine control section 101 stops the high-voltage, optical, and driving systems to finish the printing.

Even when sheets of paper at the manual paper feed port are used up during the control, the paper size mode already designated is not switched. If a user wishes to change the paper size, he or she externally enters a new paper size.

In this conventional printer, however, if no paper size is designated by an external equipment, the operation is performed by a sequence corresponding to the maximum paper size usable in the printer, and the result is a decrease in throughput. If a paper size is designated, on the other hand, a user must enter another paper size from an external equipment in order to change the paper size, resulting in a cumbersome operation.

FIG. 6 is a block diagram for explaining paper size recognition processing of an image forming apparatus of the type described above.

Referring to FIG. 6, a fixing unit 36 generates heat when a power supply 42 supplies power to a heater 43. A buffer 40 transfers an ON/OFF signal from an MPU 39 to a relay 41, and the voltage from the power supply 42 is supplied to the heater 43 by this ON/OFF signal. The MPU 39 includes a ROM that stores CPU control programs for controlling the laser beam printer, a RAM 60 used to write and read various control data, such as flags for control, in and from it, or the like. The RAM 60 has preset areas E1 to E5 for storing length data L1 to L5 related to usable recording media, such as regular sizes B4, A4, B5, Legal, and Letter.

Buffers 47-$l$ to 47-$m$ transfer the control data from the MPU 39 to individual actuators including a clutch. Buffers 48-$l$ to 48-$n$ transfer detection signals from various sensors (not shown) to the MPU 39. A controller unit 49 controls a printer engine in the laser beam printer. That is, the controller unit 49 controls the laser beam printer through an interface signal line 50 to output an image signal, thereby causing the printer to perform a print operation. A counter 51 counts pulse signals 53 supplied after application of a reset signal 52 and delivers count data 54 to a conveyance distance detector 55.

The image forming apparatus incapable of detecting the size of a recording medium before printing is arranged as described above, so the apparatus must store the lengths of usable recording media, such as the data L1 to L5, and these data undesirably occupy the memory area of the RAM 60. In addition, poor printing or conveyance may be caused when discord is determined in comparison of the medium length with the length data, and this makes it impossible to perform efficient image formation processing.

SUMMARY OF THE INVENTION

It is an object of the present invention to solve the above conventional problems.

It is another object of the present invention to provide an image forming apparatus capable of performing both error processing in which continuation of a print operation is disabled and warning processing in which it is enabled by matching a determination on the basis of not only the accord/discord between paper sizes but the presence/absence of a loss of printing data.

In order to achieve the above objects of the present invention, there is provided an image forming apparatus capable of detecting the size of fed recording paper to detect an error in which the detected size of the recording paper is in discord with a predetermined designated size, comprising determination means for comparing the detected size with the designated size in accordance with the error detection to determine which size is larger, and control means for continuously performing an image formation operation and at the same time generating a warning signal if the determination means determines that the detected size is larger than the designated size, and generating a stop signal for stopping the image formation operation if the determination means determines that the detected size is smaller than the designated size.

In the present invention, if the size of recording paper for use in recording is larger than a designated size, i.e., the size of a recording image area, the image forming apparatus continuously performs an image formation operation while generating only a warning signal because the recording image is not lost. If, on the other hand, the (detected) size of the recording paper is smaller than the designated size, the apparatus stops the image formation operation by the image formation operation stop signal.

It is still another object of the present invention to provide an image forming apparatus capable of properly controlling, with a small memory capacity, the paper feed intervals between recording media with arbitrary lengths conveyed in sequence by counting the conveyance lengths of the individual recording media conveyed in sequence and thereby controlling the respective paper feed timings of the individual subsequent recording media.

In the present invention, when paper feed means starts feeding of recording media, each counting means starts to count a conveyance time from the leading to trailing end of each of the recording media with arbitrary conveyance lengths conveyed sequentially. On the basis of the count results obtained by the individual counting means, control means varies the paper feed timing of each subsequent recording medium to be fed by the paper feed means. Therefore, although the image forming apparatus does not store all data of usable recording medium lengths, the apparatus can form a correct image at a predetermined position of each recording medium with no size error with a small memory capacity even when recording media with arbitrary lengths are fed sequentially.

It is still another object of the present invention to provide an image forming apparatus capable of solving the above problems and improving operability by preventing a decrease in throughput.

According to the present invention, the printer has a print mode in which a paper size of, e.g. a manual paper feed port having no means for determining paper size is externally designated and a print sequence corresponding to that designated size is executed, and another print mode in which a paper size is not externally designated but measured by the printer itself and a print sequence corresponding to the measured size is performed. The printer also has a function of temporarily switching to the latter size measurement mode if sheets of paper at the manual paper feed port are used up after a paper size is externally designated, and, after measuring a paper size, switching to a paper size mode corresponding to the measured paper size. These functions can improve the operability of the printer without decreasing its throughput.

Other objects, advantages, and effects of the present invention will become more apparent from the accompanying drawings, the detailed description of the embodiments, and the appended claims.

BRIEF DESCRIPTION OF THE DRAWINGS

FIG. 7 is a block diagram showing the basic arrangement of the first embodiment of the present invention;

FIG. 8 is a block diagram showing the circuit configuration of the first embodiment of the present invention;

FIG. 9 is a view for explaining the contents of status information of the first embodiment of the present invention;

FIG. 10 is a flow chart for explaining the contents of an operation sequence executed by an engine control section 201 shown in FIG. 8;

DETAILED DESCRIPTION OF THE PREFERRED EMBODIMENTS

Embodiments of the present invention will be described in detail below with reference to the accompanying drawings.

1st Embodiment

FIG. 7 shows the basic arrangement of the first embodiment of the present invention.

An image forming apparatus of this embodiment can detect the size of fed recording paper to detect an error in which the detection size of the recording paper is in discord with a predetermined designation size.

Referring to FIG. 7, a determination means 1000 compares the detection size with the designation size in accordance with the error detection to determine which size is larger.

If the determination means determines that the detection size is larger than the designation size, a control means 1100 continues an image formation operation and at the same time generates a warning signal. If the determination means determines that the detection size is smaller than the designation size, the control means 1100 generates a stop signal for stopping the image formation operation.

FIG. 8 shows a practical circuit configuration of the first embodiment of the present invention.

Figure 2:
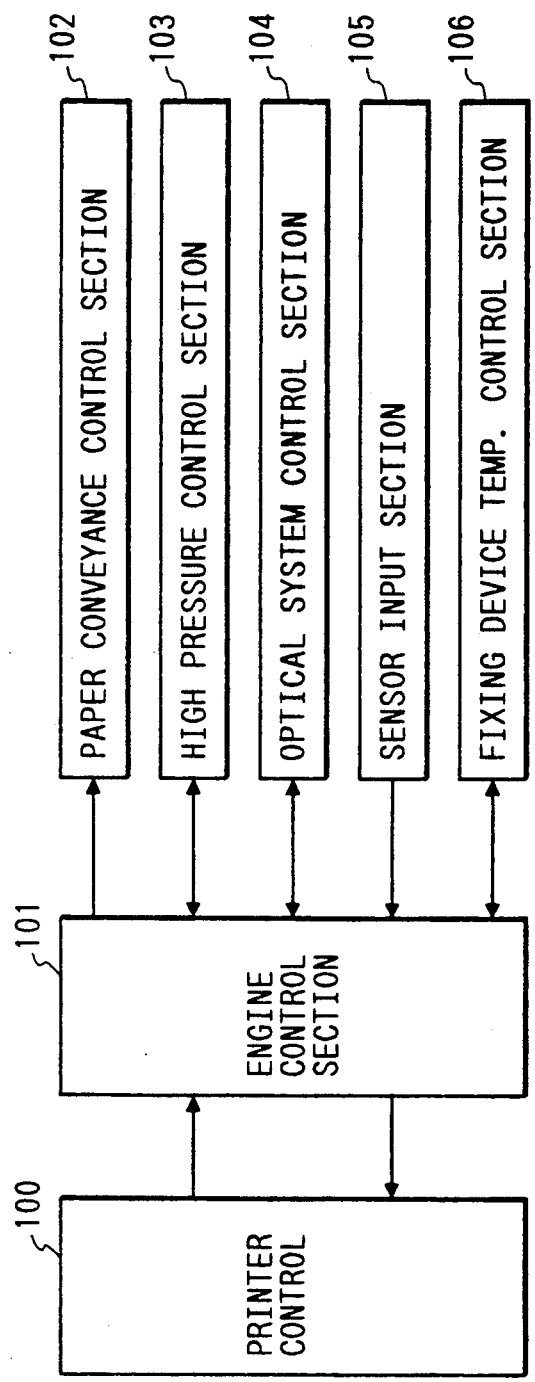
FIG. 2 is a block diagram showing the circuit configuration of the conventional printer.

Note that the same reference numerals as in the conventional arrangement shown in FIG. 2 denote the same parts in FIG. 8, and a detailed description thereof will be omitted.

An engine control section 201 of this embodiment performs error detection processing for recording paper and warning signal generation processing in accordance with an error determination criterion 201A (to be described in detail with reference to FIG. 10) different from conventional criteria.

Hence, information exchange is performed by serial communication between a printer controller 200 and the engine control section 201: the printer controller 200 sends a command, and the engine control section 201 sends a status corresponding to the command. Independently of this serial communication, signals, such as an /RDY signal indicating whether the engine is in a print enable or disable state, and a /VSREQ and a /VSYNC signal for vertical synchronization, are exchanged between the engine control section 201 and the printer controller 200.

FIG. 9 shows part of the contents of this serial communication.

Referring to FIG. 9, a command A is for requesting a status A for the engine control section 201. The status A indicates the basic condition of the printer and includes the following status items for the printer controller 200. That is, the status A includes "print requesting" for requesting a print signal, "paper conveying" indicating that the engine is conveying paper, "misprinting" indicating occurrence of a BD error or the like, "waiting" indicating that the printer is raising the temperature of a fixing device, "pausing" indicating that power supply to a heater of the fixing device is currently stopped by designation of the printer controller, and "call occurring" indicating occurrence of an error requiring an operator's response, such as a paper size discord error, a jam error, or a no paper error.

A command B is for requesting a status B for the engine control section 201. When the call bit of the state A goes to "1," the state B indicates the detailed content. The status B includes "jam error" indicating occurrence of paper jamming, "no paper error" indicating that no paper is present at the designated paper feed port, "paper size discord error" indicating that the size of paper at the manual paper feed port is detected to be different from the designated size, and the like.

A command C is for requesting a status C for generating a warning for the printer controller 200. This status C includes "no toner warning" indicating that the remaining amount of toner is lower than a certain predetermined level and the toner may become insufficient if printing is continued, and "paper size discord warning" indicating that although no image loss occurs, the designated paper size is in discord with the paper size of fed paper.

Figure 3B:
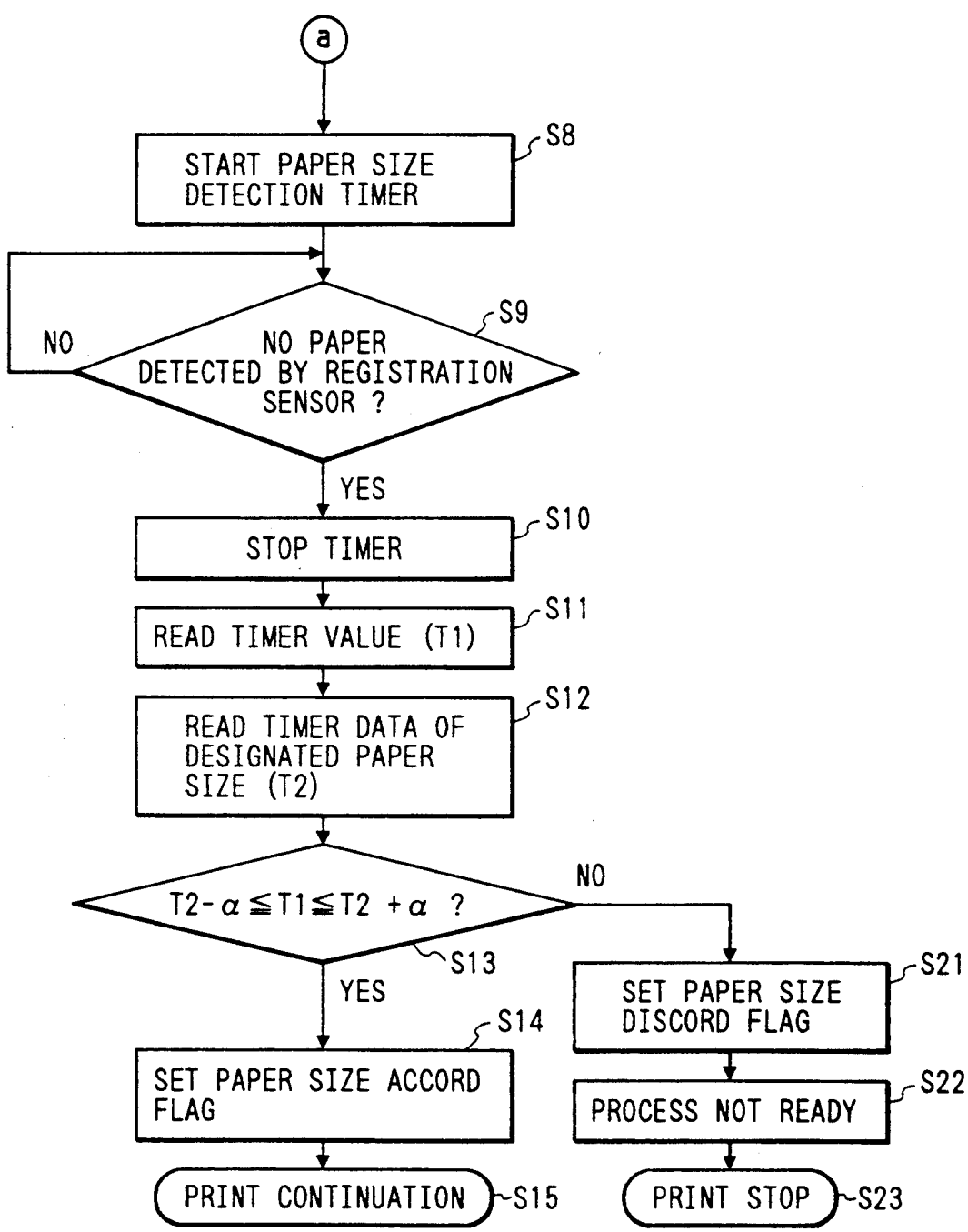
FIG. 3 is a flow chart for explaining one operation sequence of an engine control section 101 of the conventional printer.
Figure 5:
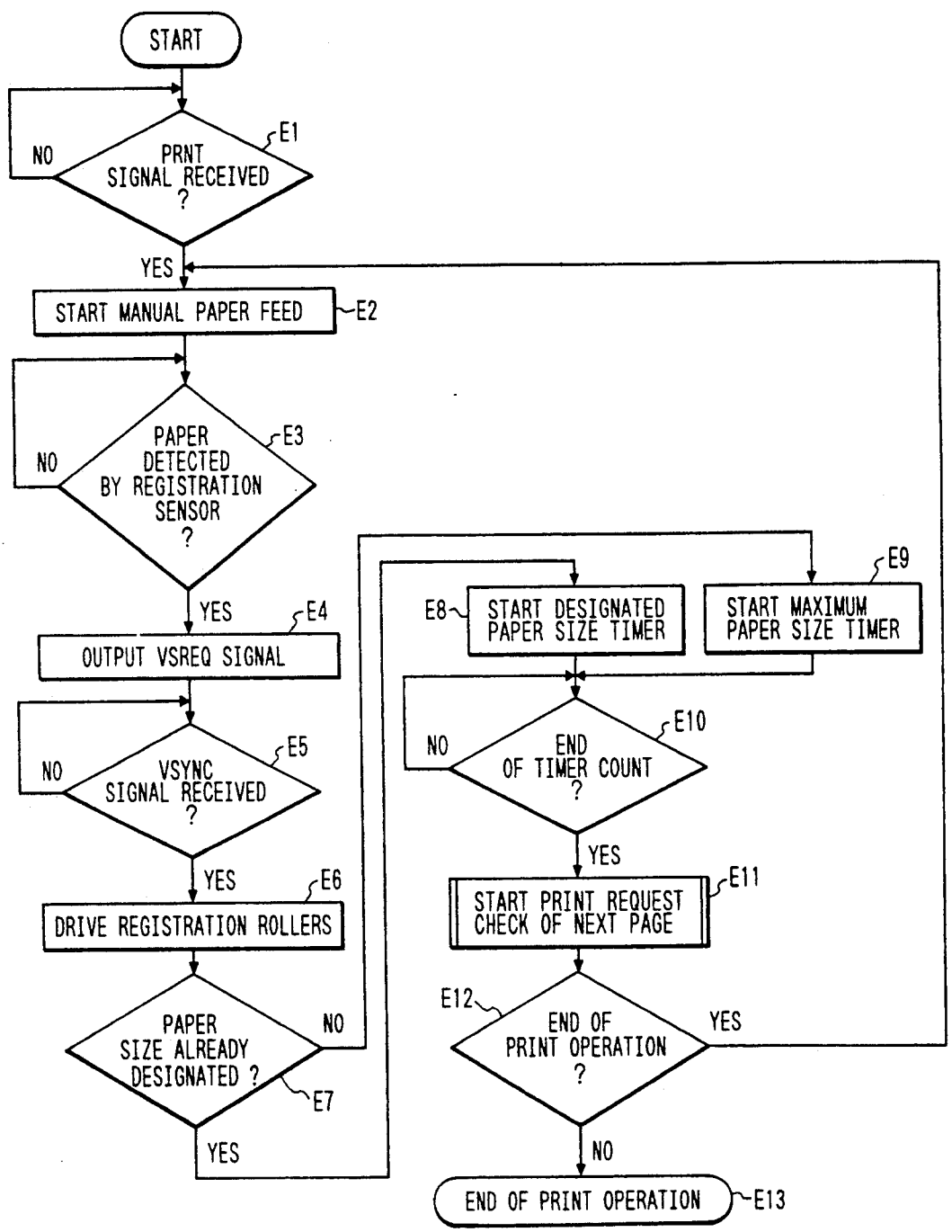
FIG. 5 is a flow chart for explaining another operation sequence of the engine control section 101 of the conventional printer.

FIG. 10 shows a control sequence executed by the engine control section 201 to perform setting/resetting of these statuses. The sequence illustrated herein is performed after the /VSYNC signal from the printer controller 200 is received. In this sequence, the same step numbers as in the prior art shown in FIG. 3 denote the same processing steps.

Figure 1:
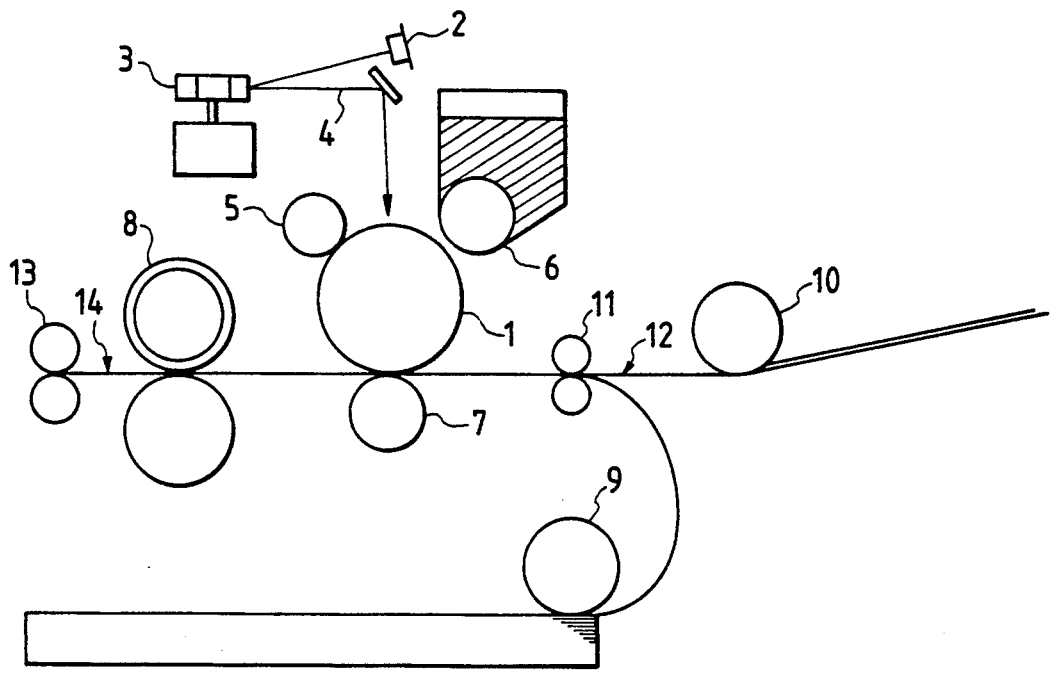
FIG. 1 is a side sectional view schematically showing the structure of a conventional printer.
Figure 4:
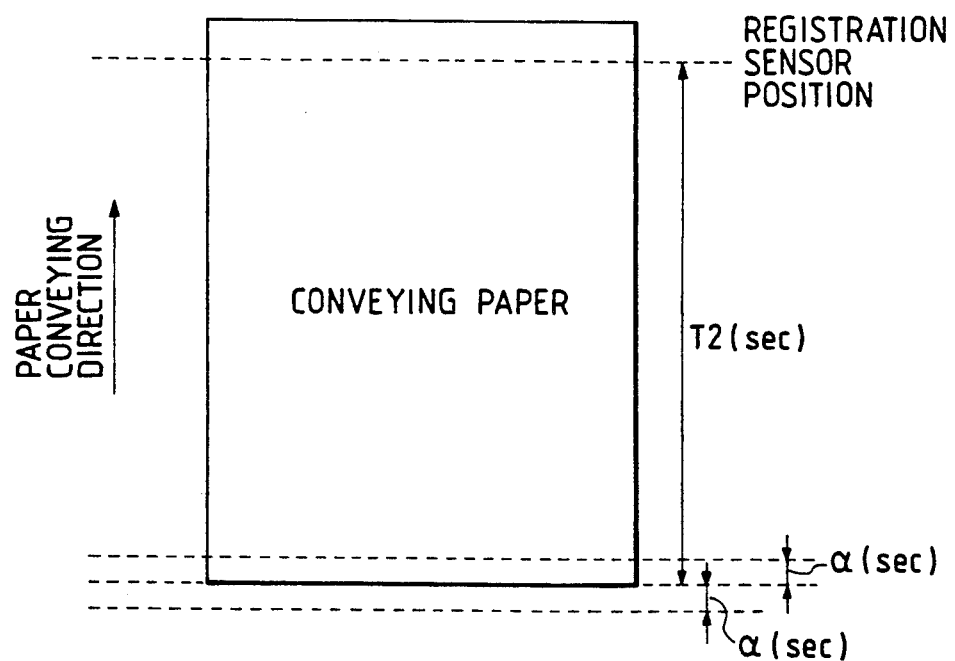
FIG. 4 is a plan view showing the sizes used in error determination in FIG. 3.

Upon receiving a print request signal from the printer controller 200, the engine control section 201 starts paper feed from the manual paper feed port as a designated paper feed port. When the fed paper has reached registration rollers 11 (see FIG. 1), the engine control section 201 outputs the /VSREQ signal to the printer controller 200.

Thereafter, upon receiving the /VSYNC signal from the printer controller 200, the engine control section 201 drives the registration rollers 11 which have been kept stationary, and at the same time drives a count-up timer for paper size detection. The engine control section 201 waits until no paper is detected by a registration sensor 12. When no paper is detected, the engine control section 201 stops the paper size detection timer and reads the timer value. The engine control section 201 also reads a predetermined reference timer value T2 for each paper size to check whether the condition of $T2-\alpha \leq T1 \leq T2+\alpha$ is established. In this case, o is the margin for measurement errors of the timer and errors in paper lengths. If the above condition is established, the engine control section 201 sets the paper size accord flag to continue the print operation (processing to this point is similar to the processing from S7 to S15 shown in FIG. 3).

If the condition is not established in step S13, the engine control section 201 checks whether the measured paper size (corresponding to the timer value T1) is larger than the designated paper size (corresponding to the reference timer value T2). If the measured paper size is determined to be smaller than the designated paper size, the engine control section 201 sets the paper size discord error status bit to "1" and the call bit of the status A to "1" and informs the printer controller 200 of the print disable state (S100→S101). If the measured paper size is determined to be larger than the designated paper size, the engine control section sets the paper size discord warning status (warning signal of the present invention) bit to "1" and enables continuation of the print operation. Note that when the print disable state is set, printing can be restarted by changing the designation paper size.

As described above, when the engine control section 201 detects a paper size discord, if there is a possibility of a loss of an image, i.e., if the measured paper size is smaller than the designated size, the engine control section 201 determines occurrence of an error and generates a "false" /RDY signal as an image formation operation stop signal. If there is no possibility of an image loss, the engine control section 201 provides only a warning and maintains the /RDY signal "true" to continue the printing. Therefore, in an apparatus, such as a facsimile apparatus, which operates unattended, an operation is not unnecessarily stopped to prevent a decrease in printing efficiency.

In addition, the printer controller 200 has communicated to it the condition in the form of a signal and can therefore cause a display unit (not shown) to display a warning message or the like. Hence, the determination of whether the subsequent printing is to be continued can be made by a user, and this improves the flexibility of use of the printer.

2nd Embodiment

Figure 11:
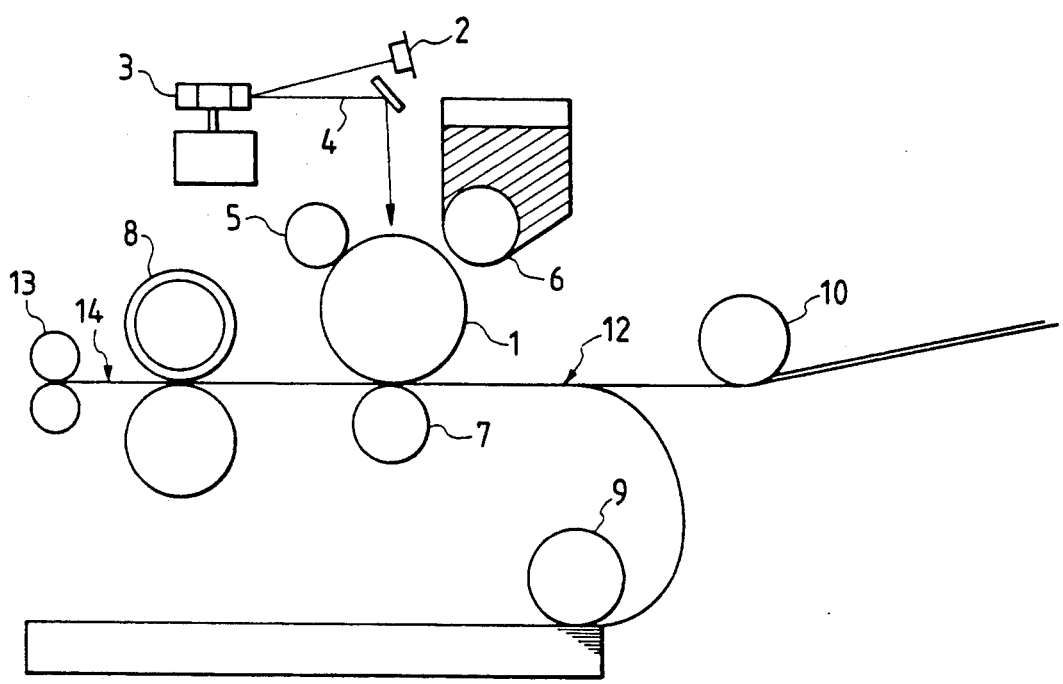
FIG. 11 is a side sectional view schematically showing the structure of the second embodiment of the present invention.

FIG. 11 shows the structure of a printer mechanism section according to the second embodiment of the present invention.

In the above first embodiment, the registration rollers 11 are provided to perform vertical synchronization by exchanging the /VSREQ signal and the /VSYNC signal between the printer controller 200 and the engine control section 201. In this second embodiment, vertical synchronization is performed by sending a /TOP signal from a printer engine by using a paper presence/absence sensor instead of the registration rollers 11. A control system is similar to that shown in FIG. 8 of the first embodiment, so a detailed description thereof will be omitted.

Figure 12:
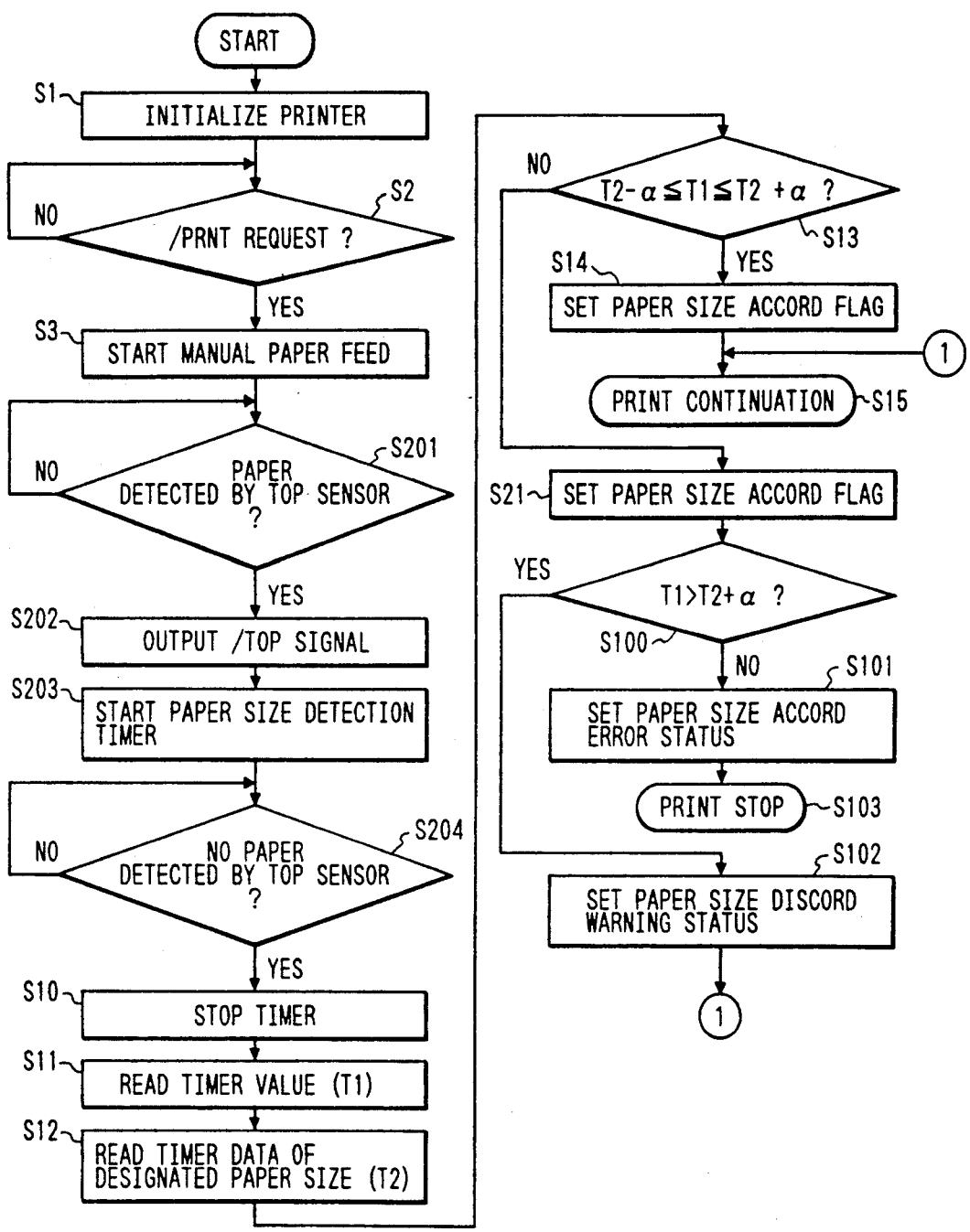
FIG. 12 is a flow chart for explaining the contents of an operation sequence executed by an engine control section 201 of the second embodiment.

FIG. 12 is a flow chart for explaining the sequence operation procedure of an engine control section 201 of the second embodiment. In FIG. 12, the same step numbers as in the conventional procedure (FIG. 3) or the procedure (FIG. 10) of the first embodiment denote the same processing operations and a detailed description thereof will be omitted.

Upon receiving a /PRNT signal from a printer controller 200, the engine control section 201 initializes high-voltage units and increases the scanner rotating speed to a predetermined rotating speed. Thereafter, the engine control section 201 starts paper feed from a manual paper feed port as a designated paper feed port.

When the paper has reached a TOP sensor, the engine control section 201 sends a /TOP signal to the printer controller 200 (S202) and at the same time activates a paper size detection timer (S203). When no paper is detected by the TOP sensor (S204), the engine control section 201 stops counting of the paper size detection timer and subsequently determines the accord/discord between the paper sizes by a sequence similar to the sequence shown in the first embodiment (S10 to S14 or S10 to S13→S21→S100 to S102).

3rd Embodiment

Figure 13:
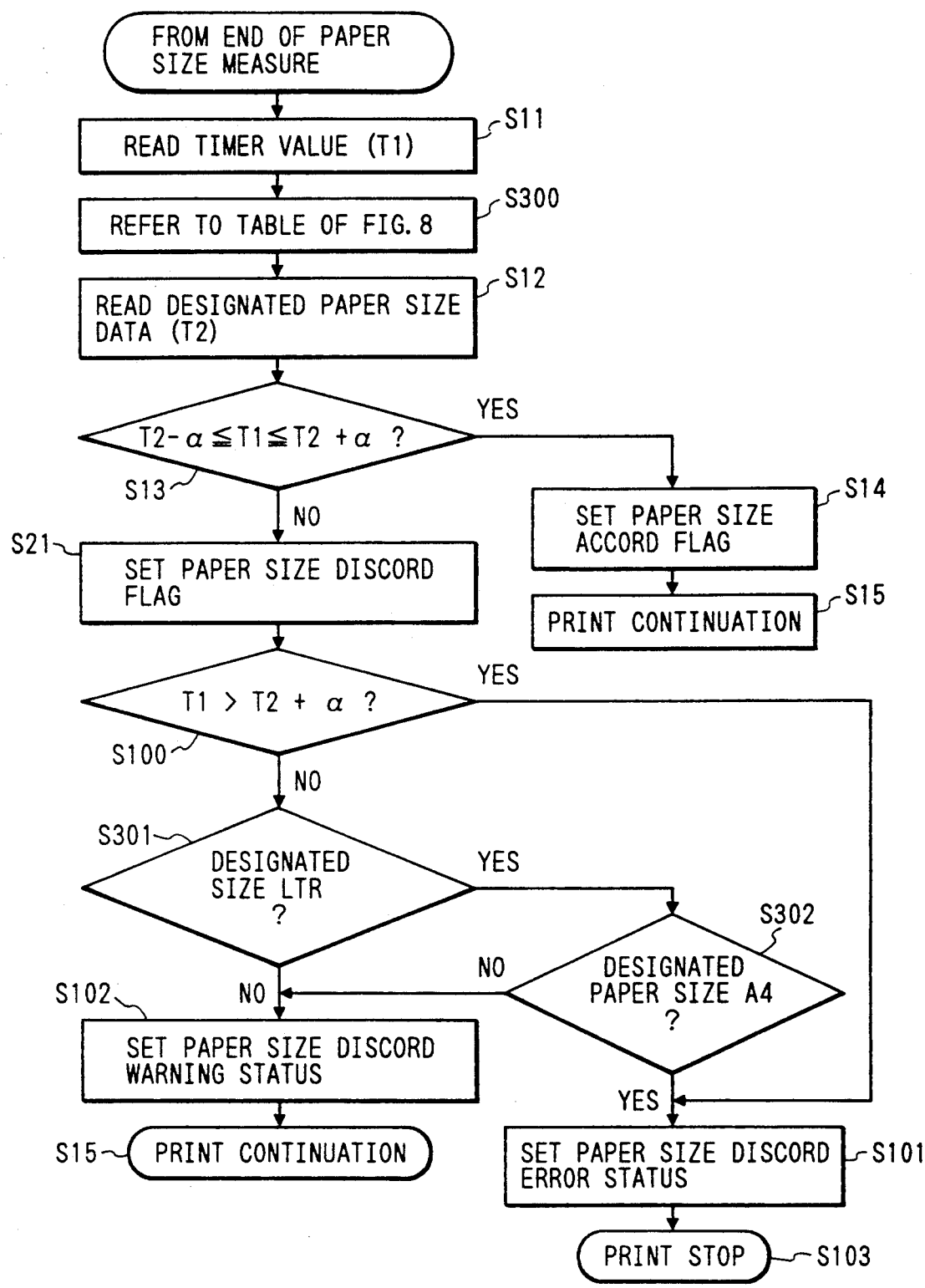
FIG. 13 is a flow chart for explaining the contents of an operation sequence executed by an engine control section 201 of the third embodiment of the present invention.

FIG. 13 shows paper size comparing processing according to the third embodiment of the present invention. A mechanism section and a control system may be either of the systems of the first and second embodiments described above.

In the flow chart of FIG. 13, it is assumed that paper sizes usable in the printer are B5, A4, and LTR, each in the longitudinal direction.

Figures 14, 15:
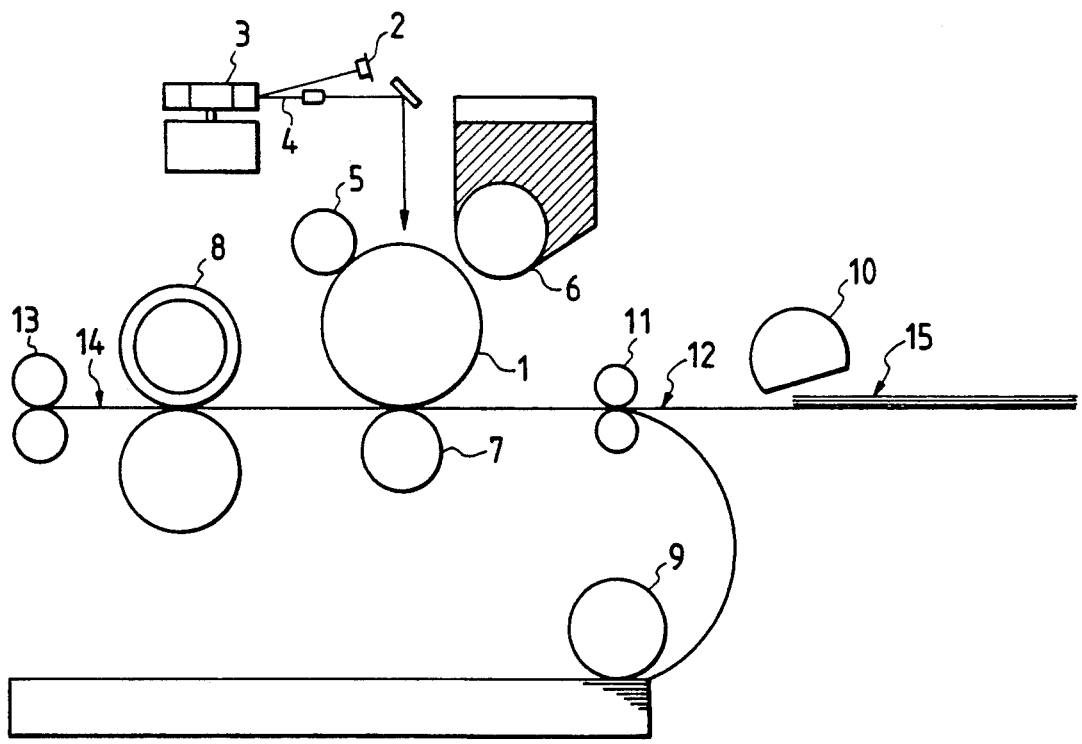
FIG. 14 is a view showing the contents of a table used in the third embodiment of the present invention.
FIG. 15 is a sectional view showing the arrangement of an image forming apparatus according to the fourth embodiment of the present invention.

When measurement of the paper size is finished, an engine control section 201 reads a timer value and identifies the type of the measured paper size by referring to a table (stored in the engine control section 201) as shown in FIG. 14 (S300). The engine control section 201 also reads data of a designated paper size (S12) and checks whether the condition of $T2 - \alpha \leq T1 \leq T2 + \alpha$ is met (S13). If the condition is met, the printing is continued (S14→S15).

If the condition is not met, the engine control section 201 compares the designated size with the measured paper size. If the measured size is determined to be smaller, the engine control section 201 determines a paper size discord error to stop the printing (S100→S101→S103).

If the measured size is determined to be larger, the engine control section 201 performs a measurement to check whether the designated size is LTR (S100→S301). If the engine control section 201 determines that the designated size is LTR and the measured size is A4, the section 201 determines a paper size discord error and stops the print operation (S301→S302→S101→S103). Since other size relationships are such that when the paper length is large, the width is also large, the above processing is not performed, and the determination is made on the basis of only the paper length.

The above first to third embodiments can be applied not only to a manual paper feed port having no determined paper size but also to a multiple manual paper feed port, a universal cassette, or a cassette without a paper size detection function.

The present invention can also be applied to the case wherein an image forming apparatus using a universal cassette by which a paper size can be identified is used, and a user switches a size set member of the universal cassette in correspondence with the size of paper stored in the cassette. In this case, if a user fails to correctly switch the size set member of the universal cassette in accordance with the set paper size, a size read by the printer is in discord with the paper size to be actually used.

Error processing performed by the present invention in the above case will be described below. When the function of the first embodiment is applied to this case, the operation sequence of the engine control section is the one shown in FIG. 10. Likewise, when the functions of the second and third embodiments are applied to this case, the operation sequences shown in FIGS. 12 and 13 are used, respectively. Note that in each of these operation sequences, the control is exactly the same except the size designated by the controller is the paper size obtained by reading the size set member of the cassette.

According to the first to third embodiments as described above, if a fed sheet of recording paper is larger than a recording image area (corresponding to a designated size of recording paper), an image formation operation is continuously executed while only a warning is provided. Therefore, even when the image forming apparatus is installed in an automated apparatus, such as a facsimile apparatus, it is unnecessary to interrupt a recording operation due to a paper size discord error unlike in conventional apparatuses.

4th Embodiment

Figure 16:
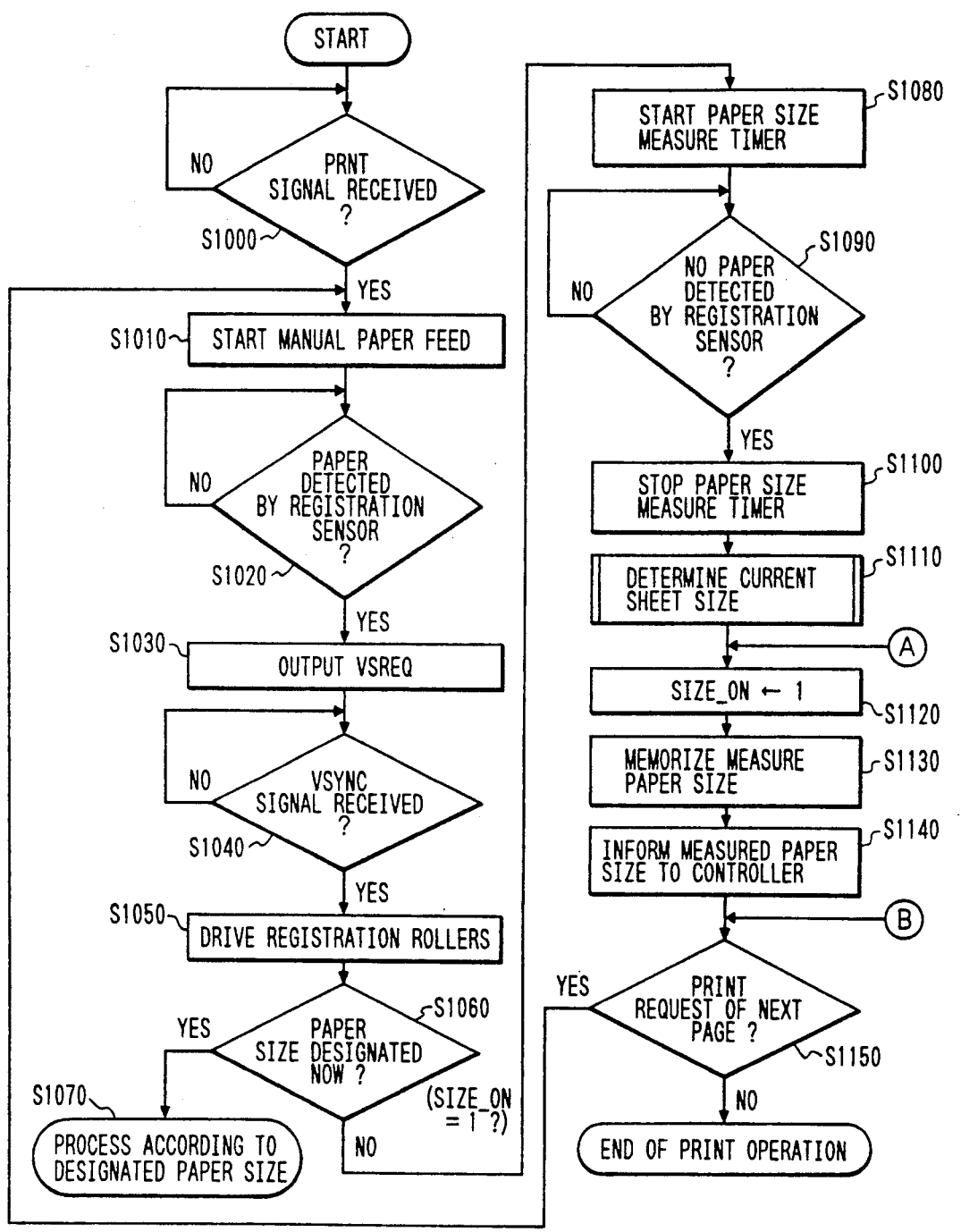
FIG. 16 is a flow chart for explaining in detail the arrangement of a control means shown in FIG. 15.
Figure 17:
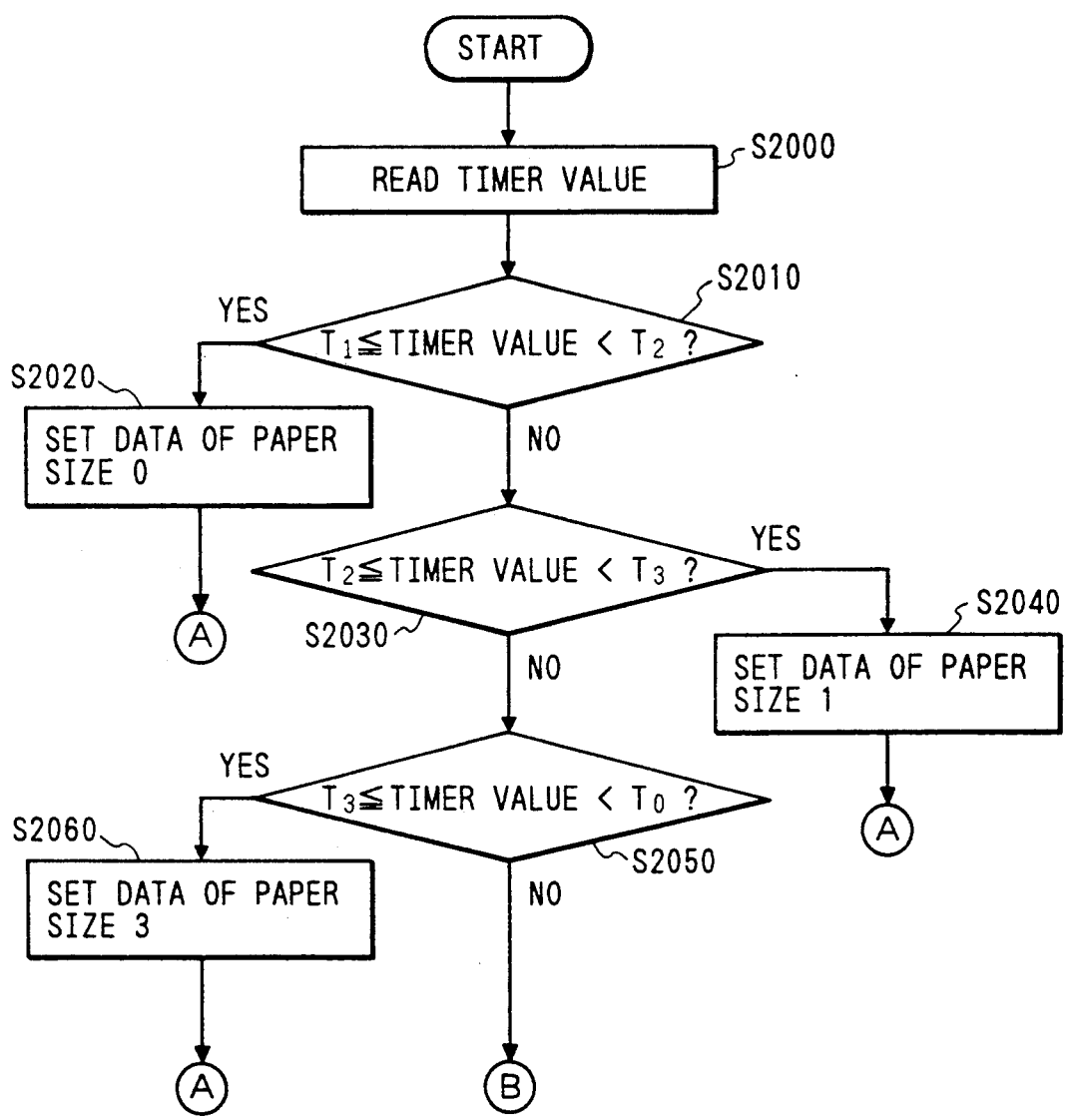
FIG. 17 is a flow chart for explaining an example of a paper size detecting procedure of the image forming apparatus according to the present invention.

FIGS. 15 to 17 show the fourth embodiment of the present invention.

FIG. 15 shows a mechanism section of the fourth embodiment, in which parts denoted by reference numerals 1 to 14 have the same functions as those shown in the prior art (FIG. 1) and a detailed description thereof will be omitted. This mechanism also includes a sensor 15 for detecting the presence/absence of paper at a manual paper feed portion. Although a control system for controlling this mechanism section is similar to that of the prior art (FIG. 2), the paper presence/absence sensor 15 is included in a sensor input section 105.

The print control performed by an engine control section of this embodiment for the case wherein a printer controller designates the paper size of a manual paper feed portion is illustrated in FIG. 16, and that for the case wherein the printer controller does not designate it is illustrated in FIG. 17.

FIG. 16 is a flow chart schematically showing a manual feed print sequence performed when no paper size is designated by the printer controller.

First, the engine control section waits for a print request signal from the controller (S1000). Upon receiving the PRNT signal, the engine control section initializes a high-voltage system, an optical system, and a driving system (none of the systems are shown), and starts to rotate a paper feed roller for feeding paper (S1010). Thereafter, when the leading end of the paper has reached a registration sensor (S1020), the engine control section outputs a VSREQ signal, as a vertical synchronization signal, to the controller (S1030). Upon receiving a VSYNC signal from the controller (S1040), the engine control section drives registration rollers to permit an image write operation by a laser (S1050). In addition, when starting driving of the registration rollers, the engine control section checks a flag SIZE-ON for determining whether the size of the fed paper is designated by the controller (S1060)l If SIZE-ON=1, i.e., if the paper size is already designated by the controller, the engine control section performs a print sequence according to that designated size (S1070). If SIZE-ON=0, i.e., if no size is designated, the engine control section activates a timer for measuring the paper size (S1080). This timer is stopped when no paper is detected by the registration sensor (S1090 and S1100). Therefore, the timer value represents the length of paper being conveyed in the subscan direction (paper conveyance direction). A method (S1110) of actually determining the length of paper being conveyed by using this timer value is illustrated in FIG. 17.

Referring to FIG. 17, the engine control section first reads the timer value (S2000) and checks whether the read value falls within a predetermined timer value range for each paper size (S2010, S2030, and S2050).

For example, if the timer value is from $T_1$ to less than $T_2$, the paper size 0 is determined. Therefore, the engine control section sets a paper size meeting this condition as the paper size 0 (S2020). If the paper size does not correspond to any predetermined paper size, the flow advances to step S1150 in FIG. 16 without performing any size designation.

If the paper size is set, the flow advances to step S1120 in FIG. 16, and the engine control section sets "1" in the flag SIZE-ON for indicating that the paper size is designated. The engine control section also stores the designated size in a memory and informs the controller of the setting of the paper size (S1130 and S1140). Thereafter, the engine control section checks whether a print request for the next page is present (S1150). If no further print request is present, the engine control section immediately finishes the print operation. If a print request is present, the flow returns to the first step S1010. Note that in manual feed printing at this time, a paper size is set in S1110 and SIZE-ON=1. Therefore, when the flow advances to S1060, processing according to a designated paper size is performed.

The information of the paper size is supplied to the printer controller via status information on a serial communication. On the basis of the value of this paper size designation status, the printer controller controls the print area of an image and the like.

5th Embodiment

Figure 18:
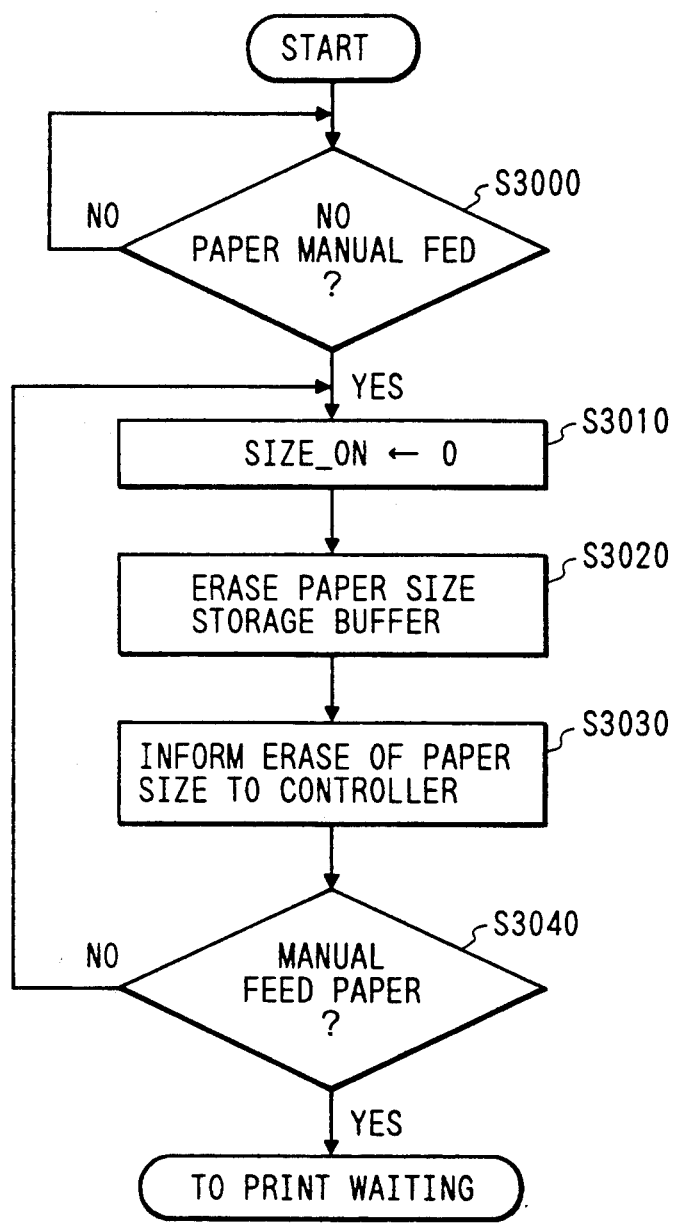
FIG. 18 is a flow chart for explaining the fifth embodiment of the present invention.

FIG. 18 is a flow chart showing the fifth embodiment of the present invention. In this embodiment, assume that while a print operation is executed after designation of a paper size by a printer controller, sheets of manual feed paper are used up, and a user continues the printing by setting another paper size.

The arrangement of the printer is similar to that of the first embodiment described above.

FIG. 18 is a flow chart showing processing from detection of no paper to print waiting through detection of the presence of paper. If no paper is detected during printing, an engine control section finishes printing of sheets of paper already picked up and then stops the print operation to perform processing in S3000. In this processing, the engine control section sets "0" in a SIZE-ON flag indicating that a paper size is designated (S3020), erases the contents of a memory storing paper sizes, and informs the controller of the erasure of the paper sizes (S3030). If no paper is continuously detected, the erase operation of S3010 and S3020 is repeatedly performed. Therefore, if the controller returns to a command for paper size designation, this value is constantly erased. If paper manually fed is detected, the flow advances to print waiting in S2000. If the controller designates a paper size, ordinary paper size designation is performed. If no paper size is designated, a paper size measurement mode is set. In this mode, even if a user sets paper with a different size, the paper size is measured for the first sheet of paper, and the subsequent print control is performed on the basis of the measured paper size.

6th Embodiment

Figure 19B:
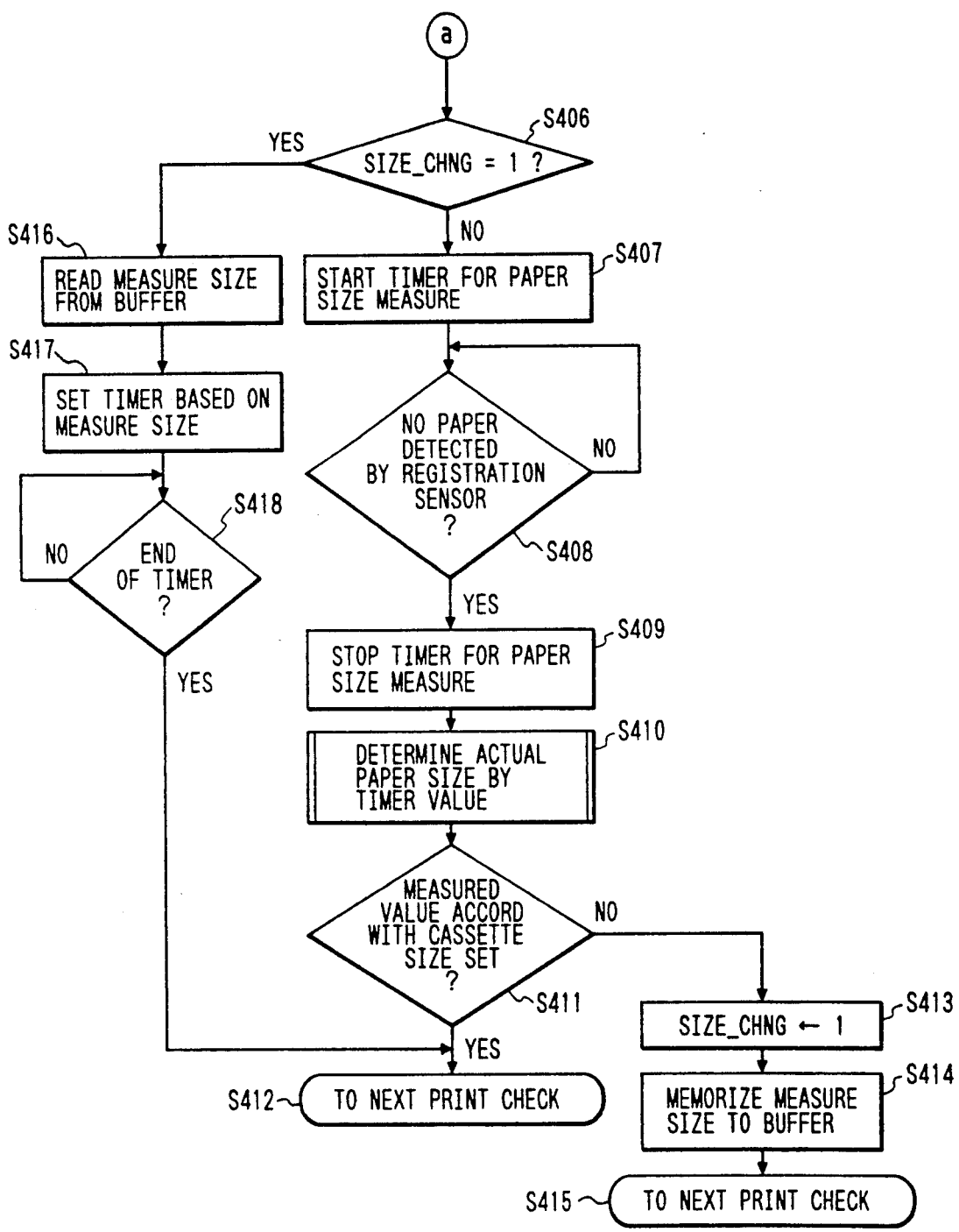
FIG. 19 is a flow chart for explaining the sixth embodiment of the present invention.

FIG. 19, which comprises FIGS. 19A and 19B, is a flow chart showing the sixth embodiment of the present invention.

The sixth embodiment is applied not to manual paper feed but to a universal cassette. A universal cassette has no fixed size unlike ordinary cassettes and can therefore correspond to various types of paper when a user sets a cassette size set member.

The present invention can be similarly applied to such a universal cassette.

The difference of this embodiment from the above embodiment is that a controller does not designate a paper size but is informed of a paper size set by a user.

Since processing to driving of registration rollers (S4000 to S4050) is similar to that of the above embodiment (S1000 to S1050), the subsequent processing will be described. A SIZE-CHNG flag is set when the size set member set by a user is in discord with actual paper in the cassette. If SIZE-CHNG=0 in step S4060, a mode of measuring the length of paper actually being conveyed is set (S4060). The measurement is performed by activating a timer for paper size measurement (S4070) and using a registration sensor. An engine control section determines a paper size (S4100) in accordance with a time from the activation of the timer to detection of no paper by the registration sensor (S4080 and S4090), thereby determining accord/discord between the set member and the measured size (S4110). If accord is determined, the engine control section immediately checks the next print (S4120). If discord is determined, the engine control section sets SIZE-CHNG flag determination the measured size in a buffer (S4140). Thereafter, the flow again advances to the SIZE-CHNG flag determination processing (S4060) through step S4150. In this case, since SIZE-CHNG=1 in step S4060, the engine control section reads out the measured size from the buffer (S4160), sets a timer corresponding to that size (S4170), and checks the presence/absence of the next print (S4120) after the timer counting is finished (S4180). This mode of SIZE-CHNG=1 is continued until the engine control section determines that the cassette is pulled out.

The above processing is applied to the arrangement in which a universal cassette has a size set member to be set by a user. However, a similar effect can be obtained by using the size measurement mode of this embodiment without using the size set member.

As described above, in a printer having a paper feed port, of which a paper size is not known and hence the paper size of which is designated by a controller, there are provided a print mode based on a designated size, a print mode for measuring a paper size, and the following functions:

1. If a designated size is different from an actual size, the print mode is temporarily switched to the size measurement mode to perform the print operation by using the measured size as the designated size.
2. If sheets of paper are used up during printing performed by a designated size, the print mode is temporarily switched to the size measurement mode to measure a newly set size, and the print operation is performed by using the measured size as the designated size.

These functions eliminate inconvenience in operation from a user having to enter a paper size each time he or she changes a paper size, and can make the use of a size set member of a universal cassette unnecessary. Consequently, this embodiment largely contributes to improvements in printer performance.

7th Embodiment

Figure 20:
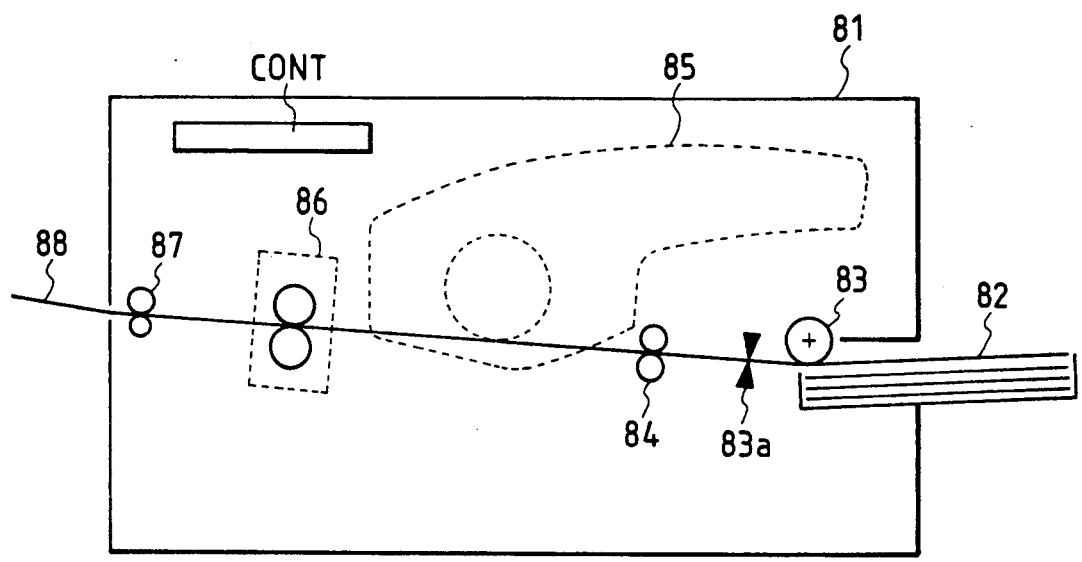
FIG. 20 is a sectional view showing the arrangement of an image forming apparatus according to the seventh embodiment of the present invention.

FIG. 20 is a sectional view for explaining the arrangement of an image forming apparatus according to the seventh embodiment of the present invention.

Referring to FIG. 20, this image forming apparatus includes a laser beam printer main body 81 and a paper feed cassette 82. Each recording medium stored in the paper feed cassette 82 is fed to the position of registration rollers 84 by driving a paper feed roller 83, and a paper feed sensor 83a detects the paper feed timing. An image transfer section 85 performs image formation up to transfer onto conveyed recording paper as a recording medium. Note that the image formation processing of the image transfer section 85 has no direct connection with the present invention and a detailed description thereof will be omitted. A fixing unit 86 fixes an image to be recorded subjected to the transfer process by applying heat and pressure. Paper delivery rollers 87 deliver the recording medium passing through the fixing unit 86 to a paper delivery tray 88. The apparatus also comprises a control means CONT for totally controlling the individual devices on the basis of control procedures stored beforehand.

Figure 6:
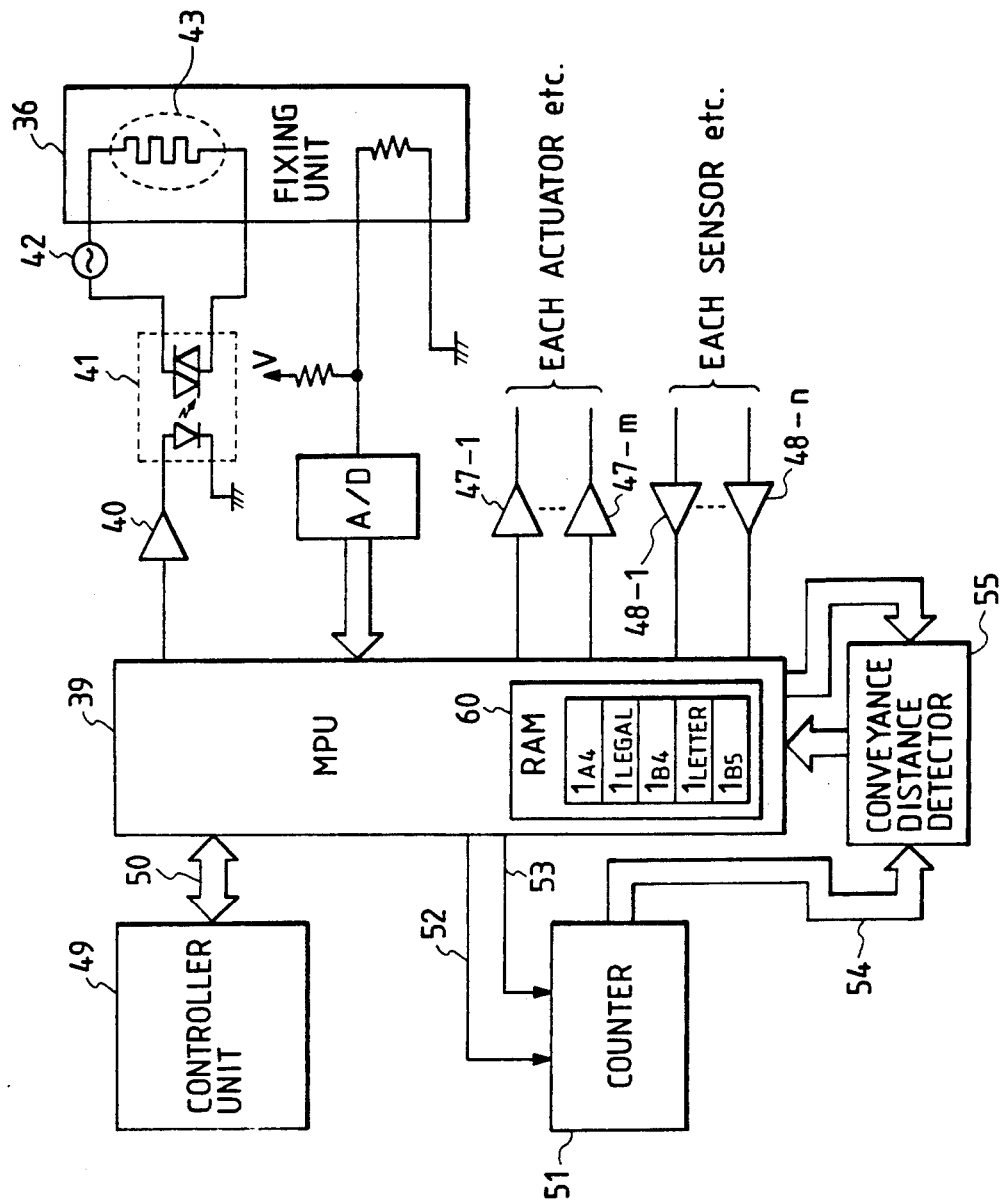
FIG. 6 is a block diagram showing an arrangement for performing paper size recognition processing.
Figure 21:
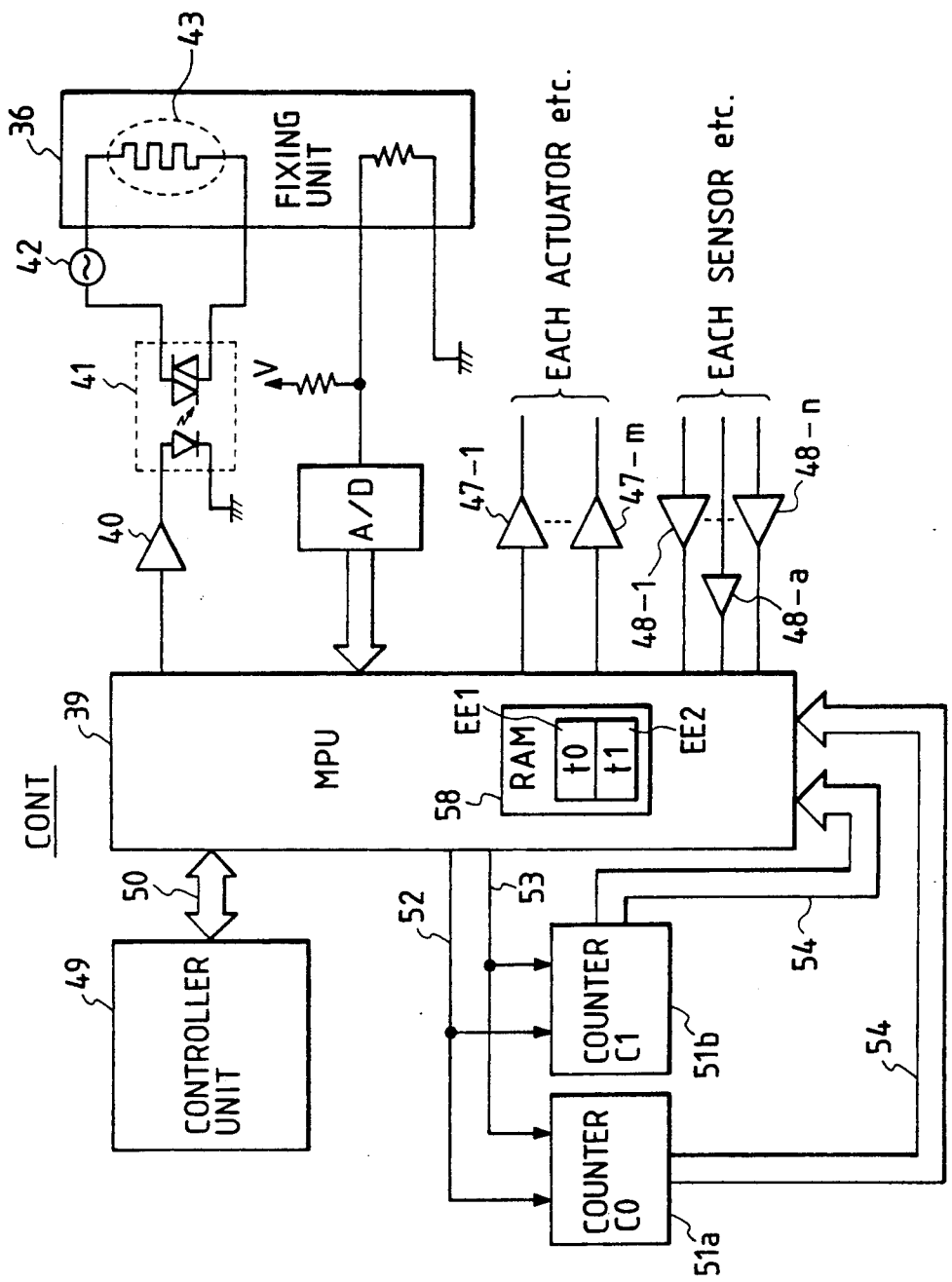
FIG. 21 is a block diagram showing a detailed arrangement of a control means CONT shown in FIG. 20.

FIG. 21 is a block diagram for explaining the detailed arrangement of the control means CONT shown in FIG. 20, in which the same reference numerals as in FIG. 6 denote the same parts.

Referring to FIG. 21, a RAM 58 stores various control data, such as flags for control, and conveyance times t0 and t1 for determining a conveyance time of a recording medium. The counts of counters 51a and 51b are cleared by a reset signal 52, and a count pulse signal 53 of, e.g., 1 pulse/msec is supplied from an MPU 39. Count data 54 of each of the counters 51a and 51b is, e.g., an 8-bit data signal. The count data 54 is cleared to "0" upon application of the reset signal 52 and is incremented by "1" each time the count pulse 53 is applied. The count output values 54 from the counters 51a and 51b are stored as the conveyance times t0 and t1 in the RAM 58 of the MPU 39.

In the image forming apparatus having the above arrangement, when feed of recording paper is started by the paper feed means (paper feed roller 83), each count means (in this embodiment, each of the counters 51a and 51b) starts to count a conveyance time from the leading to trailing end of each of recording media fed in sequence and having arbitrary conveyance lengths. The control means (MPU 39) varies a paper feed timing, at which the paper feed means feeds each subsequent recording medium, on the basis of the respective count results obtained by the individual count means. Therefore, although the apparatus does not store all data of usable recording medium lengths, the paper feed condition can be controlled with a small memory capacity (in this embodiment, areas EE1 and EE2 of the RAM 58 are used) such that even if recording media with arbitrary lengths are fed in sequence, a correct image can be formed on a predetermined position of each subsequent recording medium with no size error.

The paper size detection operation performed by the image forming apparatus according to the present invention will be described below with reference to the flow chart shown in FIG. 22.

Figure 22:
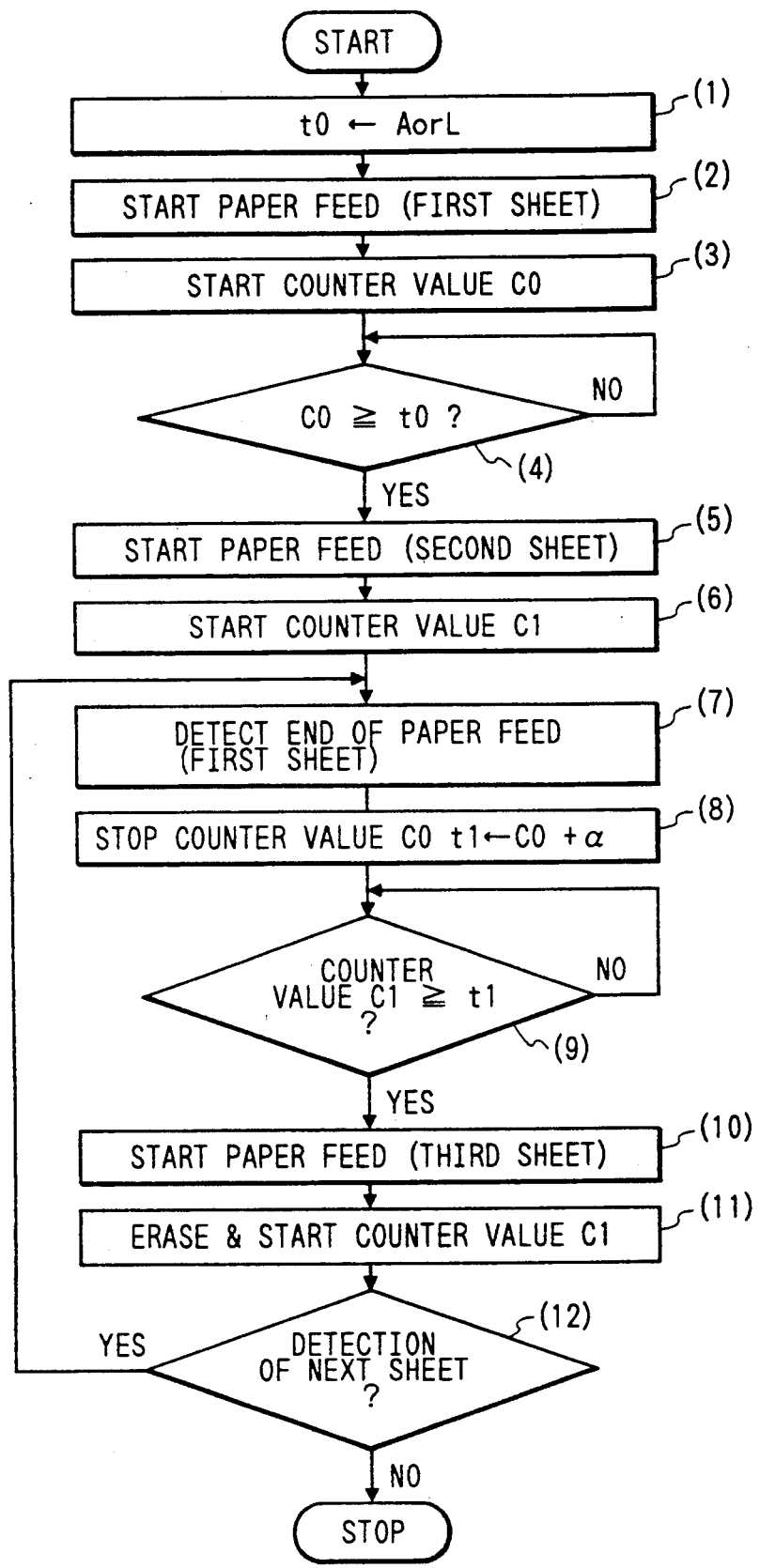
FIG. 22 is a flow chart for explaining the operation of the seventh embodiment of the present invention.

FIG. 22 is a flow chart for explaining an example of a paper size detection procedure in the image forming apparatus according to the present invention, in which numbers (1) to (12) indicate individual steps. Note that the procedure shown in FIG. 22 indicates processing from start of printing for the first sheet upon reception of a print request to designation of a paper feed operation for the third sheet. Note also that the laser beam printer main body 81 shown in FIG. 20 has no paper size sensor, so the printer cannot recognize a set paper size before a print operation.

First, as the designated stored value t0 in the area EE1 of the RAM 58, a counter value A is set for a paper size of A4 or smaller designated by a controller unit 49 so that paper conveyance is performed for the paper as "A4", and a counter value L is set for that larger than A4 as "Legal" (1). Subsequently, a paper feed operation for the first sheet is started (2). At the same time, counting of the counter 51a is started (3) An engine control section waits until the counter value C0 of the counter 51a becomes the designated stored value t0 set in the area EE1 of the RAM 58 or more (4). If the counter value C0 of the counter 51a has become the value set in the area EE1 of the RAM 58 or more, i.e., the designated stored value t0 or more, the engine control section performs designation of paper feed for the second sheet (5) and starts counting of the counter value C1 (6). Subsequently, when it is detected that the trailing end of the first sheet has passed through the paper feed roller 83 (7), the engine control section stops the counter value C0 and stores that counter value (C0+α), as the conveyance time of the first sheet, in the area EE2 as the count value t1 (8). In this case, α is a conveyance interval between the individual sheets.

Subsequently, while the second sheet is conveyed, the counter value C1 keeps counting. If the counter value C1 of the counter 51b exceeds the above count value t1 (9), the engine control section starts paper feed of the third sheet (10), erases the counter value C1, and restarts the counting (11), thereby allowing the counter value C1 to function as a counter for counting the paper feed timing of the fourth sheet. When passing of the trailing end of the second sheet through the paper feed roller 83 is detected (12), the engine control section repeats the processing from step (7) to (12) to count a time from the start to end of paper feed of the preceding page, and sets the count value t1 obtained by adding the predetermined value α as the interval between sheets to the counted time as the paper feed start timing of the next page.

Note, in this embodiment, that the conveyance time is defined as a time from paper feed of one page to paper feed of the next page. However, the timing for detecting conveyance and the detection position may be another timing, another position, and another method. For example, the conveyance time may be a time from paper feed to passing through a paper delivery sensor.

Note also that, in this embodiment, two types of paper sizes are externally set in the printer in place of conveyance times which are initial set values. However, the types and number of paper sizes are not limited to those of this embodiment.

In addition, a sensor for detecting the conveyance timing of paper is not provided in the above embodiment. However, a sensor with a high detection precision may be provided to detect the conveyance timing of paper.

Furthermore, in the above embodiment, two counters and two areas for storing determination values are provided to control the conveyance timing of paper of a size smaller or larger than the A4 size. However, the number of counters and the number of areas for storing determination values are not limited to those of the above embodiment but can be arbitrarily set in accordance with paper conditions such as the usable maximum paper size.

In the above embodiment, α is fixed as the value for determining the interval between sheets of paper. However, the throughput can be improved by setting α as a variable value. As an alternative, α as the value for determining the interval between sheets may be externally varied through communication.

As has been described above, the present invention comprises the paper feed means for feeding a recording medium, a plurality of count means each for counting a conveyance time from the leading to trailing end of each of recording media which are fed in sequence by the paper feed means and have random conveyance lengths, and the control means for varying the paper feed timing of each subsequent recording medium fed by the paper feed means on the basis of the count results of the count means. Therefore, even if the apparatus does not store paper feed length data of all usable recording media, each subsequent recording medium fed or inserted can be automatically conveyed at a proper timing. This makes it possible to form a desired image, with no size error, on the surface of a conveyed recording medium with a random size without wasting any portion of the paper. Consequently, poor printing such as in conventional printers can be reliably avoided.

In addition, since the paper feed interval can be dynamically varied in accordance with a conveyed recording medium with an random size, recording media can be fed efficiently, and this improves throughput.

Hence, a paper size detection mechanism can be omitted, and this largely reduces the storage capacity for storing paper feed length data of recording media. The results are a decrease in the total cost including the memory cost and a large expansion in the work memory to be used by the controller. This allows effective expansion of other processing operations.

The present invention can be practiced by arbitrarily combining the first to seventh embodiments described above. The present invention can also be modified within the scope of the claims.

What is claimed is:

1. An image forming apparatus comprising:
   means for recording an image onto a recording medium;
   means for conveying a recording medium to said recording means;
   means for detecting a size of the recording medium;
   means for designating a size of a recording medium onto which an image is to be recorded;
   means for comparing the detected size with the designated size to determine which size is larger; and
   controlling means for controlling said apparatus to perform a plurality of operations such that an operation performed when the detected size is larger than the designated size is different from an operation performed when the detected size is smaller than the designated size, wherein said detecting means detects the size of the recording medium during the conveyance by said conveying means.

2. An apparatus according to claim 1, further comprising means for generating a display signal when the detected size is larger than the designated size.

3. An apparatus according to claim 2, wherein said controlling means continues the image forming operation when the detected size is larger than the designated size.

4. An apparatus according to claim 1, wherein said controlling means stops the image forming operation when the detected size is smaller than the designated size.

5. An apparatus according to claim 4, wherein said apparatus includes means for restarting the image forming operation, stopped because the detected size is smaller than the designated size, by changing the designated size.

6. An apparatus according to claim 1, further comprising an image signal generating source for supplying an image signal to said recording means,
   wherein said conveying means performs the conveying operation in response to a sync signal generated in synchronism with the image signal from said image signal generating source.

7. An apparatus according to claim 1, further comprising an image signal generating source for supplying an image signal to said recording means,
   wherein said image signal generating source generates the image signal in synchronism with the conveying operation of the recording medium by said conveying means.

8. An apparatus according to claim 1, wherein said comparing means performs the comparison between the detected size and the designated size in both longitudinal and lateral directions.

9. An apparatus according to claim 1, further comprising a detachable cassette having means for identifying a size of a recording medium stored therein,
   wherein said apparatus can perform recording on a recording medium other than the recording medium stored in said cassette.

10. An image forming apparatus according to claim 1, wherein said recording means records an image on the recording medium by an electrostatic recording process.

11. An image forming apparatus according to claim 1, further comprising means for mounting a different cassette in accordance with a size of the recording medium to be stored.

12. An image forming apparatus according to claim 1, further comprising means for communicating the detected size to an image signal generating source.

13. An image forming apparatus comprising:
   means for recording an image onto a recording medium;
   means for conveying the recording medium to said recording means;
   means for detecting a size of the recording medium during the conveyance by said conveying means;
   means for designating a size of a recording medium onto which an image is to be recorded; and
   means for controlling an image forming operation,
   wherein said detecting means comprises means for measuring a length of the recording medium in a conveyance direction during the conveyance by said conveying means, and
   wherein said controlling means has a first mode for controlling the image forming operation on the basis of the detected size and a second mode for controlling the image forming operation on the basis of the designated size.

14. An apparatus according to claim 13, further comprising a detachable cassette having means for identifying a size of a recording medium stored therein,
   wherein said apparatus includes means for recording on a recording medium other than the recording medium stored in said cassette.

15. An apparatus according to claim 14, wherein said apparatus includes means for recording on a manually inserted recording medium.

16. An apparatus according to claim 15, wherein when recording is to be performed on a plurality of pages, said apparatus performs the operation by switching to the second mode by setting the detected size as the designated size for a recording medium conveyed next in the first mode.

17. An apparatus according to claim 16, further comprising means or generating a display signal when the detected size is set as the designated size for a recording medium conveyed next.

18. An apparatus according to claim 13, further comprising means for detecting presence/absence of a recording medium,
   wherein when absence of a recording medium is detected during an operation in the second mode, the operation mode is switched to the first mode.

19. An apparatus according to claim 13, wherein said controlling means controls an image area to be formed on the basis of one of the detected size and the designated size.

20. An apparatus according to claim 14, wherein said apparatus includes means for mounting a universal cassette capable of storing recording media of a plurality of sizes.

21. An apparatus according to claim 20, wherein said apparatus switches to the first mode when said universal cassette is detached during an operation in the second mode.

22. An image forming apparatus according to claim 13, further comprising means for electrostatically recording an image on the recording medium fed by said paper feed means.

23. An image forming apparatus according to claim 13, further comprising means for communicating the detected size to an image signal generating source.

24. An image forming apparatus according to claim 23, wherein said image signal generating source restricts its outputs to an image signal corresponding to the size except for the communicated size.

25. An image forming apparatus comprising:
   paper feed means for feeding a recording medium;
   detecting means for detecting a trailing end of the recording medium;
   a plurality of counting means each for counting a conveyance time for the recording medium fed by said paper feed means; and
   controlling means for controlling a paper feed timing for the subsequent recording medium fed by said paper feed means on the basis of the count results of said counting means when said paper feed means feeds a plurality of the recording mediums successively,
   wherein said paper feed means is capable of feeding a plurality of the recording mediums sequentially, and each of said plurality of counting means counts a conveyance time until said detecting means detects each trailing end of the plurality of the recording mediums fed sequentially respectively.

26. An image forming apparatus according to claim 25, further comprising means for electrostatically recording an image on the recording medium fed by said paper feed means.

27. An image forming apparatus according to claim 26, wherein said electrostatic recording means has means for scanning a photoconductive drum with a beam modulated by an image signal.

28. An image forming apparatus according to claim 25, wherein said paper feed means feeds the recording medium from a universal cassette capable of storing any of the recording mediums of a plurality of sizes.

29. An image forming apparatus according to claim 25, wherein said paper feed means has a registration roller.

30. An image forming apparatus according to claim 29, wherein each of the plurality of counting means counts a time until a trailing end of the recording medium is detected after the recording medium is fed by the registration roller.

* * * * *

UNITED STATES PATENT AND TRADEMARK OFFICE
CERTIFICATE OF CORRECTION

PATENT NO. : 5,321,486
DATED : June 14, 1994
INVENTOR(S) : TOMOKO NANBU, ET AL.

It is certified that error appears in the above-indentified patent and that said Letters Patent is hereby corrected as shown below:

Column 1,
   line 59, "transmission" should read --transmission,--.

Column 2,
   line 65, "$T2 - \alpha \leq T1 \leq T2 + T2 + \alpha$" should read
          --$T2 - \alpha \leq T1 \leq T2 + \alpha$--.

Column 8,
   line 19, "o" should read --a--.

Column 11,
   line 11, "(S1060)1" should read --(S1060).--.

Column 12,
   line 52, "SIZE-CHNG" should read --SIZE-CHNG=1 (S4130)
          and stores--; and
   line 53, "flag determination" should be deleted.

Column 14,
   line 36, "(3)" should read --(3).--.

UNITED STATES PATENT AND TRADEMARK OFFICE
CERTIFICATE OF CORRECTION

PATENT NO. : 5,321,486
DATED : June 14, 1994
INVENTOR(S) : TOMOKO NANBU, ET AL.

It is certified that error appears in the above-indentified patent and that said Letters Patent is hereby corrected as shown below:

Column 15,
  line 53, "an" should read --a--.

Column 17,
  line 36, "or" should read --for--.

Column 18,
  line 12, "outputs" should read --output--.

Signed and Sealed this

Twenty-fifth Day of October, 1994

Attest:

BRUCE LEHMAN

Attesting Officer

Commissioner of Patents and Trademarks